United States Patent
Poloniewicz et al.

(10) Patent No.: US 11,647,286 B2
(45) Date of Patent: May 9, 2023

(54) SYSTEMS, METHODS, AND APPARATUSES FOR FOCUS SELECTION USING IMAGE DISPARITY

(71) Applicant: Hand Held Products, Inc., Charlotte, NC (US)

(72) Inventors: Paul Poloniewicz, Charlotte, NC (US); Tao Xian, Mount Laurel, NJ (US); Chen Feng, Mount Laurel, NJ (US)

(73) Assignee: HAND HELD PRODUCTS, INC., Charlotte, NC (US)

( * ) Notice: Subject to any disclaimer, the term of this patent is extended or adjusted under 35 U.S.C. 154(b) by 0 days.

(21) Appl. No.: 17/804,900

(22) Filed: Jun. 1, 2022

(65) Prior Publication Data
US 2022/0303451 A1    Sep. 22, 2022

Related U.S. Application Data

(63) Continuation of application No. 17/145,269, filed on Jan. 8, 2021, now Pat. No. 11,381,729.

(51) Int. Cl.
*H04N 5/232* (2006.01)
*G06T 7/50* (2017.01)
(Continued)

(52) U.S. Cl.
CPC ........... *H04N 5/23212* (2013.01); *G06T 7/50* (2017.01); *G06T 7/70* (2017.01); *G06T 9/00* (2013.01);
(Continued)

(58) Field of Classification Search
CPC ............. H04N 5/23212; H04N 5/2258; H04N 5/23218; H04N 5/2324; G06T 7/50; G06T 7/70; G06T 9/00
See application file for complete search history.

(56) References Cited

U.S. PATENT DOCUMENTS

| 5,115,269 A | 5/1992 | Masanaga et al. |
| 5,764,786 A | 6/1998 | Kuwashima et al. |

(Continued)

FOREIGN PATENT DOCUMENTS

| JP | 07-168090 A | 7/1995 |
| JP | 2007-074696 A | 3/2007 |

(Continued)

OTHER PUBLICATIONS

European search report dated May 25, 2022 for EP Application No. 21218083.

(Continued)

*Primary Examiner* — Hung H Lam
(74) *Attorney, Agent, or Firm* — Alston & Bird LLP

(57) ABSTRACT

Embodiments of the disclosure relate generally to automatic focus selection in a multi-imager environment. Embodiments include methods, systems, and apparatuses configured for capturing by a first image sensor, a first image of a visual object with a background associated with a subject. A characteristic difference between the visual object in the first image and the background in the first image is determined and a distance determination mode is selected based on the determined characteristic difference. Accordingly, a distance to the subject is calculated based on the selected distance determination mode and a second image sensor is controlled to capture a second image of the subject, based on the calculated distance to the subject.

20 Claims, 12 Drawing Sheets

(51) Int. Cl.
*G06T 7/70* (2017.01)
*G06T 9/00* (2006.01)
*H04N 5/225* (2006.01)
*G06T 5/00* (2006.01)

(52) U.S. Cl.
CPC ....... *H04N 5/2258* (2013.01); *H04N 5/23218* (2018.08); *H04N 5/23245* (2013.01)

(56) References Cited

U.S. PATENT DOCUMENTS

| | | | |
|---|---|---|---|
| 6,163,342 A * | 12/2000 | Suzuki | H04N 1/00795 348/222.1 |
| 7,303,131 B2 | 12/2007 | Carlson et al. | |
| 7,320,431 B2 | 1/2008 | Zhu et al. | |
| 7,988,053 B2 | 8/2011 | Kotlarsky et al. | |
| 8,711,271 B2 | 4/2014 | Sugimoto et al. | |
| 2013/0314501 A1* | 11/2013 | Davidson | H04N 13/122 348/46 |
| 2015/0054978 A1* | 2/2015 | Shibagami | G06T 7/12 348/222.1 |
| 2015/0227779 A1* | 8/2015 | Kawai | H04N 13/128 382/154 |
| 2015/0363619 A1 | 12/2015 | Lei | |
| 2016/0050407 A1 | 2/2016 | Chen | |
| 2017/0200283 A1* | 7/2017 | Yamaguchi | H04N 5/23245 |
| 2017/0289421 A1 | 10/2017 | Tan et al. | |
| 2019/0320120 A1 | 10/2019 | Du et al. | |

FOREIGN PATENT DOCUMENTS

| | | |
|---|---|---|
| WO | 2017/099854 A1 | 6/2017 |
| WO | 2020/131204 A1 | 6/2020 |

OTHER PUBLICATIONS

Notice of Allowance and Fees Due (PTOL-85) dated Mar. 1, 2022 for U.S. Appl. No. 17/145,269.
Notice of Allowance received for U.S. Appl. No. 17/145,269, dated Mar. 1, 2022, 12 pages.
English Translation of JP Office Action dated Aug. 17, 2022 for JP Application No. 2022001725.
JP Office Action dated Aug. 17, 2022 for JP Application No. 2022001725.

* cited by examiner

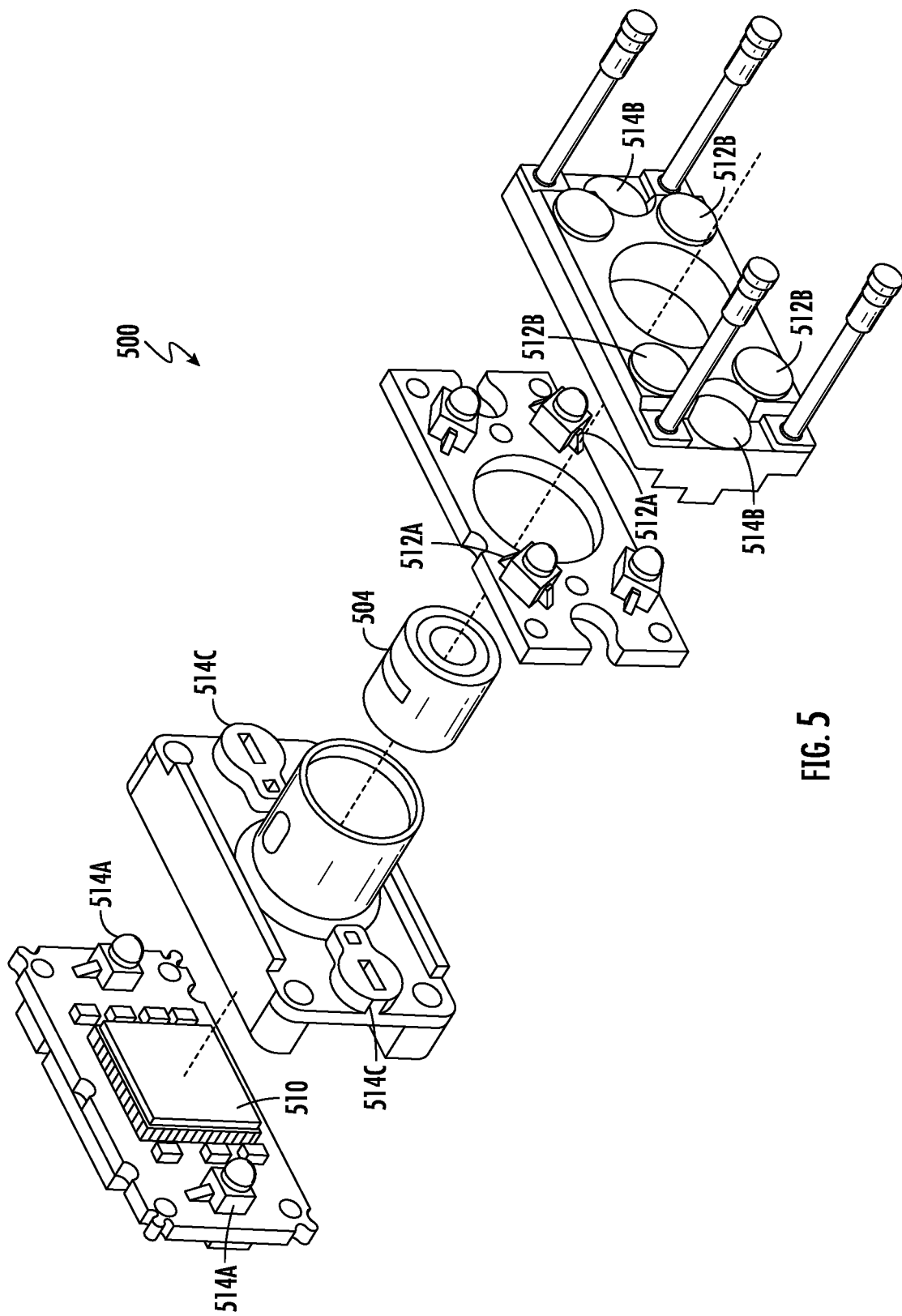

SYSTEMS, METHODS, AND APPARATUSES FOR FOCUS SELECTION USING IMAGE DISPARITY

CROSS-REFERENCE TO RELATED APPLICATIONS

This application is a continuation of U.S. patent application Ser. No. 17/145,269, filed Jan. 8, 2021, which is incorporated herein by reference in its entirety.

TECHNOLOGICAL FIELD

Embodiments of the present disclosure generally relate to methods and system for imaging using multiple image sensors, and more particularly to focus selection using image disparity for such methods and systems.

BACKGROUND

In imaging apparatuses, lenses are often designed and arranged such that objects at a particular predetermined range appear in focus via the lens. An image sensor is utilized to capture image data representing a field of view via the lens. Oftentimes when an object to be imaged is out of focus of the lens, the lens needs to be moved to one or more other focal positions to bring the object in focus. To provide the ability to alter the focus, conventional implementations for variable focusing remain bulky, slow, and/or vulnerable to one or more environmental impacts. In this regard, conventional variable focus lenses have limited operability and are incapable of attending to different imaging conditions.

SUMMARY

In general, embodiments of the present disclosure provided herein are configured for automatic focus selection in a multi-imager (or a multi-image sensor) environment. Example embodiments described and illustrated herein provide a fast and automatic focus selection mechanism and scheme for imaging engines having multiple image sensors. Some example embodiments are directed towards focus selection estimation based on image disparity between images obtained from different sensors of a multi-imager imaging engine. Other implementations for one or more of alternative focus mechanisms and/or alternative focus schemes will be, or will become, apparent to one with skill in the art upon examination of the following figures and detailed description. It is intended that all such additional implementations be included within this description, be within the scope of the disclosure, and be protected by the following claims.

In accordance with some example embodiments, provided herein is an imaging method. The method may be implemented using any of a myriad of implementations, such as via hardware, software, and/or firmware of a multi-sensor imaging engine and/or multi-sensor imaging apparatus as described herein. In some example implementations of the method, the example method includes capturing by a first image sensor, a first image of a visual object with a background associated with a subject. The example method further includes determining a characteristic difference between the visual object in the first image and the background in the first image and selecting a distance determination mode from among a first mode and a second mode, based on the determined characteristic difference. The example method further includes calculating a distance to the subject based on the selected distance determination mode and controlling a second image sensor to capture a second image of the subject, based on the calculated distance to the subject.

Additionally or alternatively, in some embodiments of the method, determining the characteristic difference comprises determining an intensity difference between a first intensity of the visual object in the first image and a second intensity of the background in the first image.

Additionally or alternatively, in some embodiments of the method, selecting the distance determination mode comprises in response to the intensity difference being greater than or equal to a threshold, selecting the first mode as the distance determination mode and in response to the intensity difference being less than the threshold, selecting the second mode as the distance determination mode.

Additionally or alternatively, in some embodiments of the method, the first mode comprises calculating a depth of the visual object in the first image as the distance to the subject.

Additionally or alternatively, in some embodiments of the method, the second mode comprises determining a first location of the subject in the first image, capturing by a second image sensor, a third image of the subject, determining a second location of the subject in the third image, and calculating the distance to the subject as a function of the first location and the second location.

Additionally or alternatively, in some embodiments of the method, the method further comprises calculating the distance to the subject, based on imaging distances of the first image sensor and the second image sensor.

Additionally or alternatively, in some embodiments of the method, calculating the distance to the subject as a function of the first location and the second location comprises calculating a first image offset of the first image based on the first location, calculating a second image offset of the second image based on the second location, and calculating the distance to the subject based on the first image offset and the second image offset.

Additionally or alternatively, in some embodiments of the method, the method further comprises changing a focus position of the second image sensor based on the calculated distance to the subject.

Additionally or alternatively, in some embodiments of the method, the method further comprises capturing by the second image sensor, the second image of the subject from the changed focus position and decoding the second image to extract information encoded in the subject.

Additionally or alternatively, in some embodiments of the method, the visual object is an aimer projection, the subject comprises an information indicia, the first image sensor comprises a near-field image sensor, and the second image sensor comprises a far-field image sensor.

In accordance with some example embodiments, provided herein is an imaging system. In an example embodiment, the imaging system comprises a memory configured to store executable instructions and one or more processors configured to execute the executable instructions. In some example embodiments, the one or processors are configured to obtain from a first image sensor, a first image of a visual object with a background associated with a subject. In some example embodiments, the one or more processors are further configured to determine a characteristic difference between the visual object in the first image and the background in the first image and select a distance determination mode from among a first mode and a second mode, based on the determined characteristic difference. In some example embodiments, the one or more processors are further configured to calculate a distance to the subject based on the selected distance determination mode and control a second image sensor to capture a second image of the subject, based on the calculated distance to the subject.

Additionally or alternatively, in some embodiments of the imaging system, to determine the characteristic difference, the one or more processors are configured to determine an intensity difference between a first intensity of the visual object and a second intensity of the background.

Additionally or alternatively, in some embodiments of the imaging system, to select the distance determination mode, the one or more processors are configured to in response to the intensity difference being greater than or equal to a threshold, select the first mode as the distance determination mode. Alternatively, in some example embodiments of the imaging system, to select the distance determination mode the one or more processors are configured to in response to the intensity difference being less than the threshold, select the second mode as the distance determination mode.

Additionally or alternatively, in some embodiments of the imaging system, the first mode comprises instructions to calculate a depth of the visual object in the first image as the distance to the subject.

Additionally or alternatively, in some embodiments of the imaging system, the second mode comprises instructions to determine a first location of the subject in the first image, obtain from a second image sensor, a third image of the subject, determine a second location of the subject in the third image, and calculate the distance to the subject as a function of the first location and the second location.

Additionally or alternatively, in some embodiments of the imaging system, the one or more processors are further configured to calculate the distance of the subject, based on imaging distances of the first image sensor and the second image sensor.

Additionally or alternatively, in some embodiments of the imaging system, to calculate the distance of the subject as a function of the first location and the second location, the one or more processors are configured to calculate a first image offset of the first image based on the first location, calculate a second image offset of the second image based on the second location, and calculate the distance of the subject based on the first image offset and the second image offset.

Additionally or alternatively, in some embodiments of the imaging system, the one or more processors are further configured to change a focus position of the second image sensor based on the calculated distance to the subject.

Additionally or alternatively, in some embodiments of the imaging system, the one or more processors are further configured to obtain from the second image sensor, the second image of the subject from the changed focus position and decode the second image to extract information encoded in the subject.

In some example embodiments an imaging apparatus is provided. In an example embodiment, the apparatus comprises a first image sensor, a second image sensor, and a controller. In some example embodiments, the first image sensor is configured to capture a first image of a visual object with a background associated with a subject. In some example embodiments, the controller is configured to obtain the first image from the first image sensor, determine a characteristic difference between the visual object in the first image and the background in the first image and select a distance determination mode from among a first mode and a second mode, based on the determined characteristic difference. In some example embodiments, the controller is further configured to calculate a distance to the subject based on the selected distance determination mode and control the second image sensor to capture a second image of the subject, based on the calculated distance.

BRIEF DESCRIPTION OF THE DRAWINGS

Figure 1A:
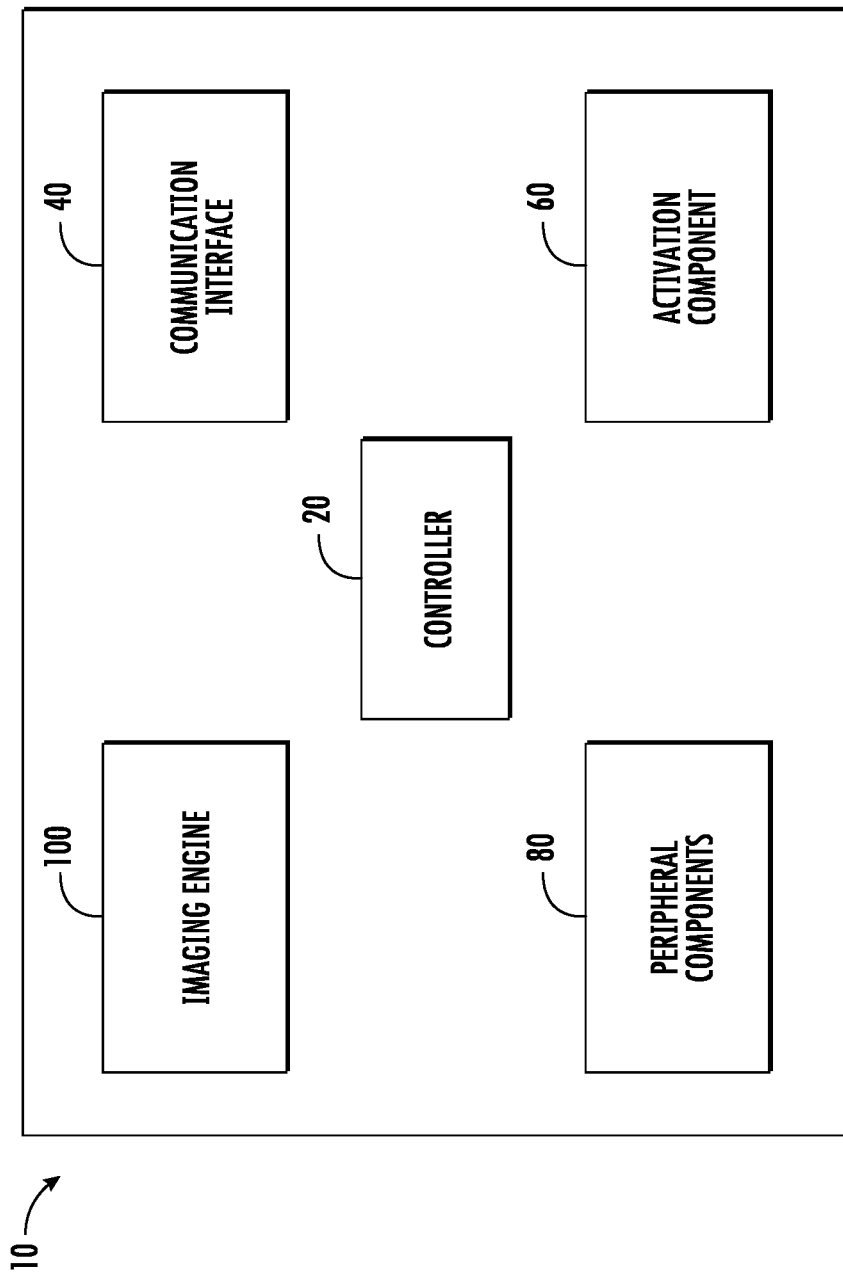
Figure 1B:
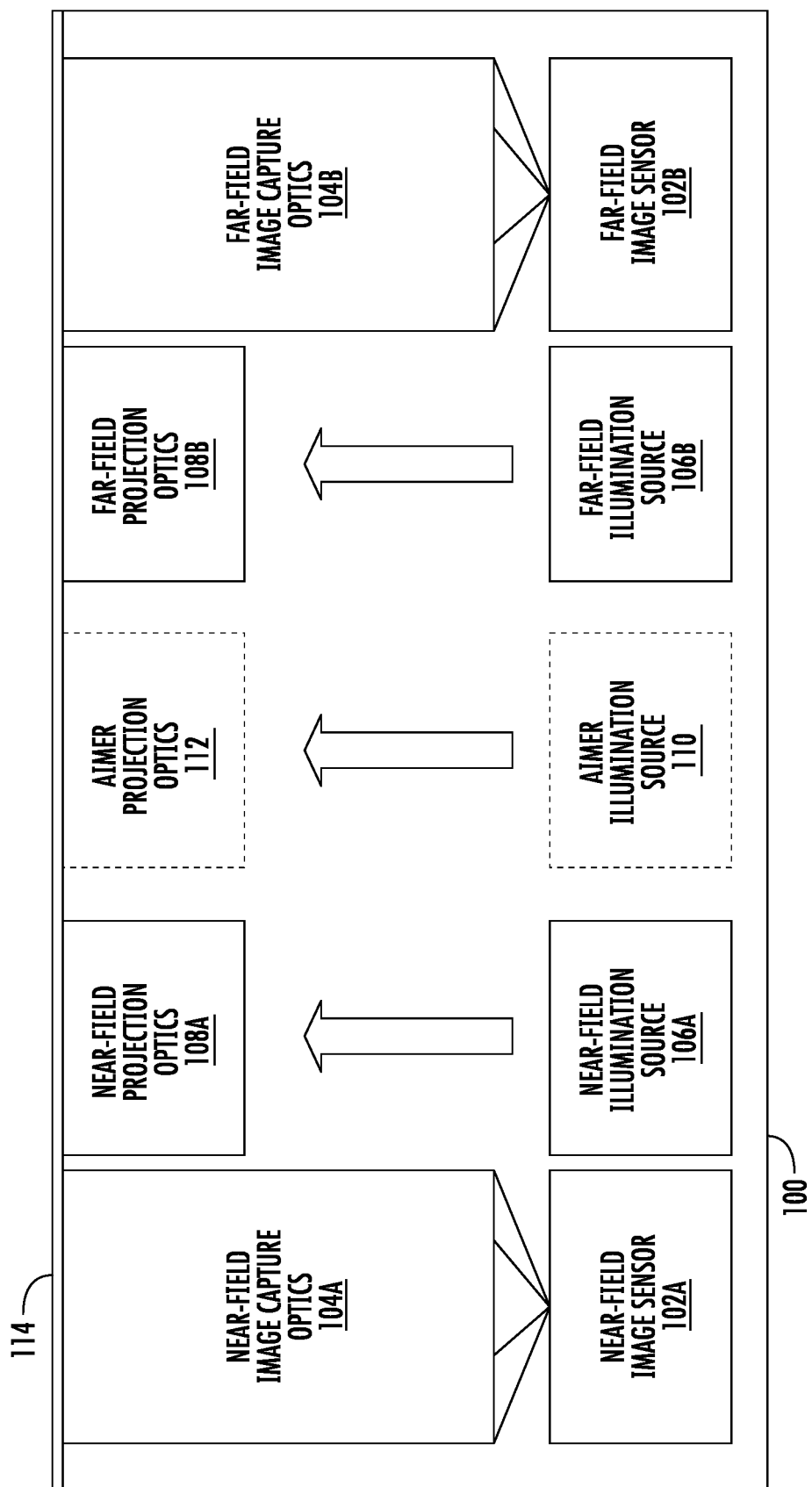
Figure 2:
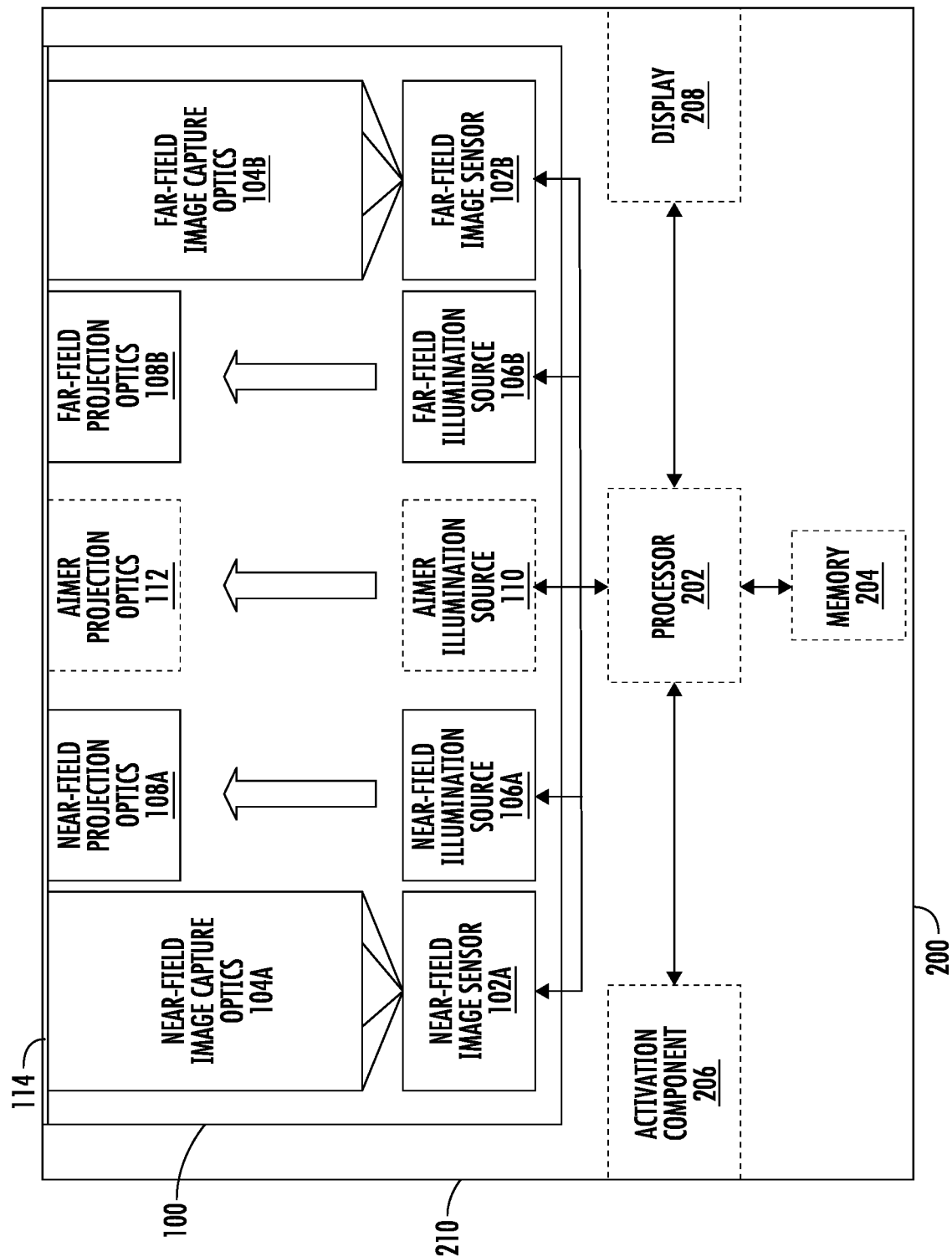
Figure 3:
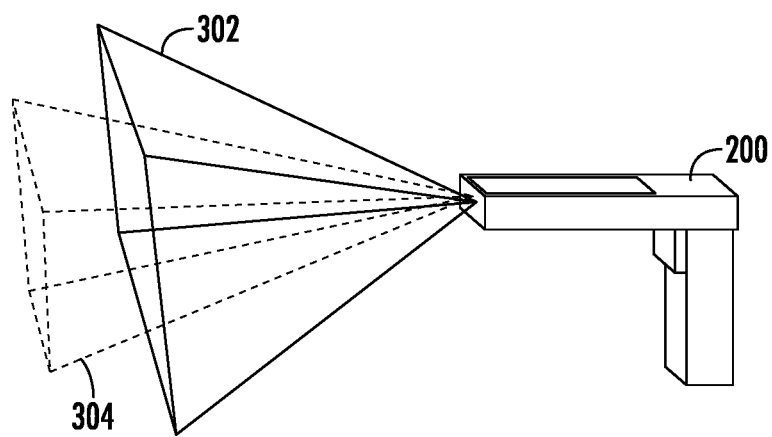
Figure 4A:
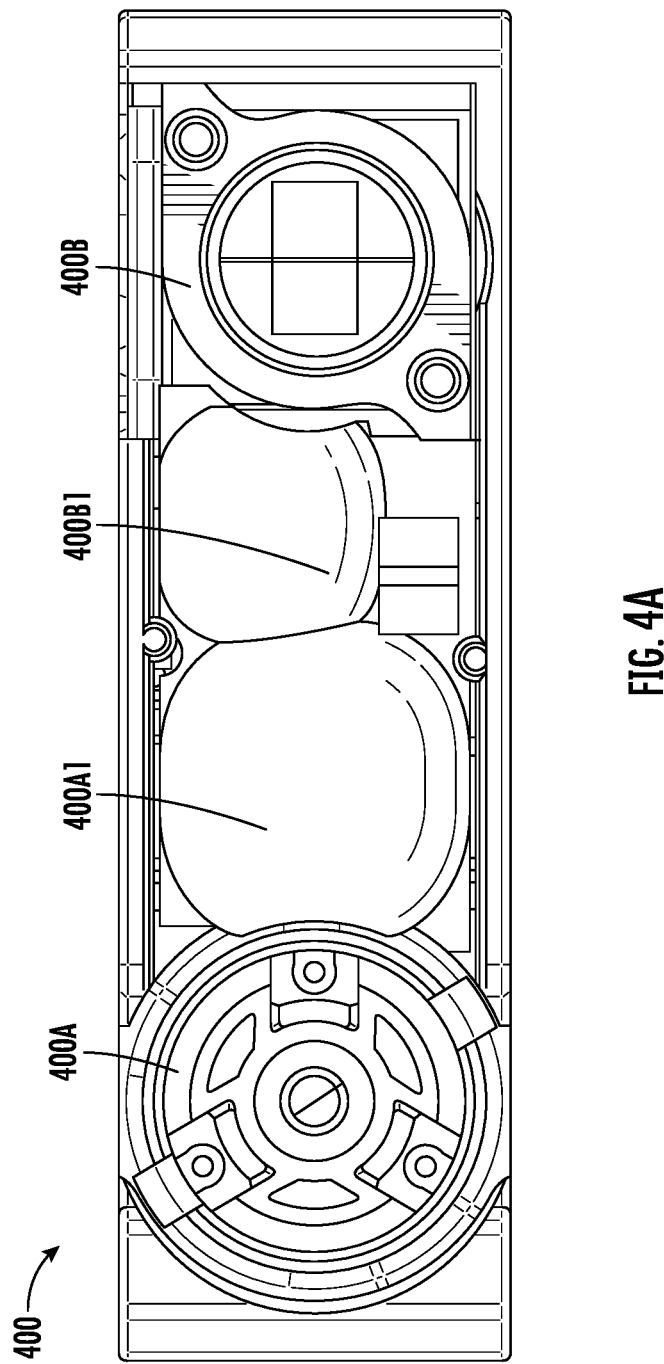

Having thus described the embodiments of the disclosure in general terms, reference now will be made to the accompanying drawings, which are not necessarily drawn to scale, and wherein:

FIG. 1A illustrates a block diagram of an example multi-sensor imaging system, in accordance with an example embodiment of the present disclosure;

FIG. 1B illustrates a block diagram of an example multi-sensor imaging engine, in accordance with an example embodiment of the present disclosure;

FIG. 2 illustrates a block diagram of an example multi-sensor imaging apparatus, in accordance with an example embodiment of the present disclosure;

FIG. 3 illustrates a visualization of field of views associated with an example multi-sensor imaging apparatus, in accordance with an example embodiment of the present disclosure;

FIG. 4A illustrates a perspective view of an example multi-image sensor imaging apparatus, in accordance with an example embodiment of the present disclosure.

Figure 4B:
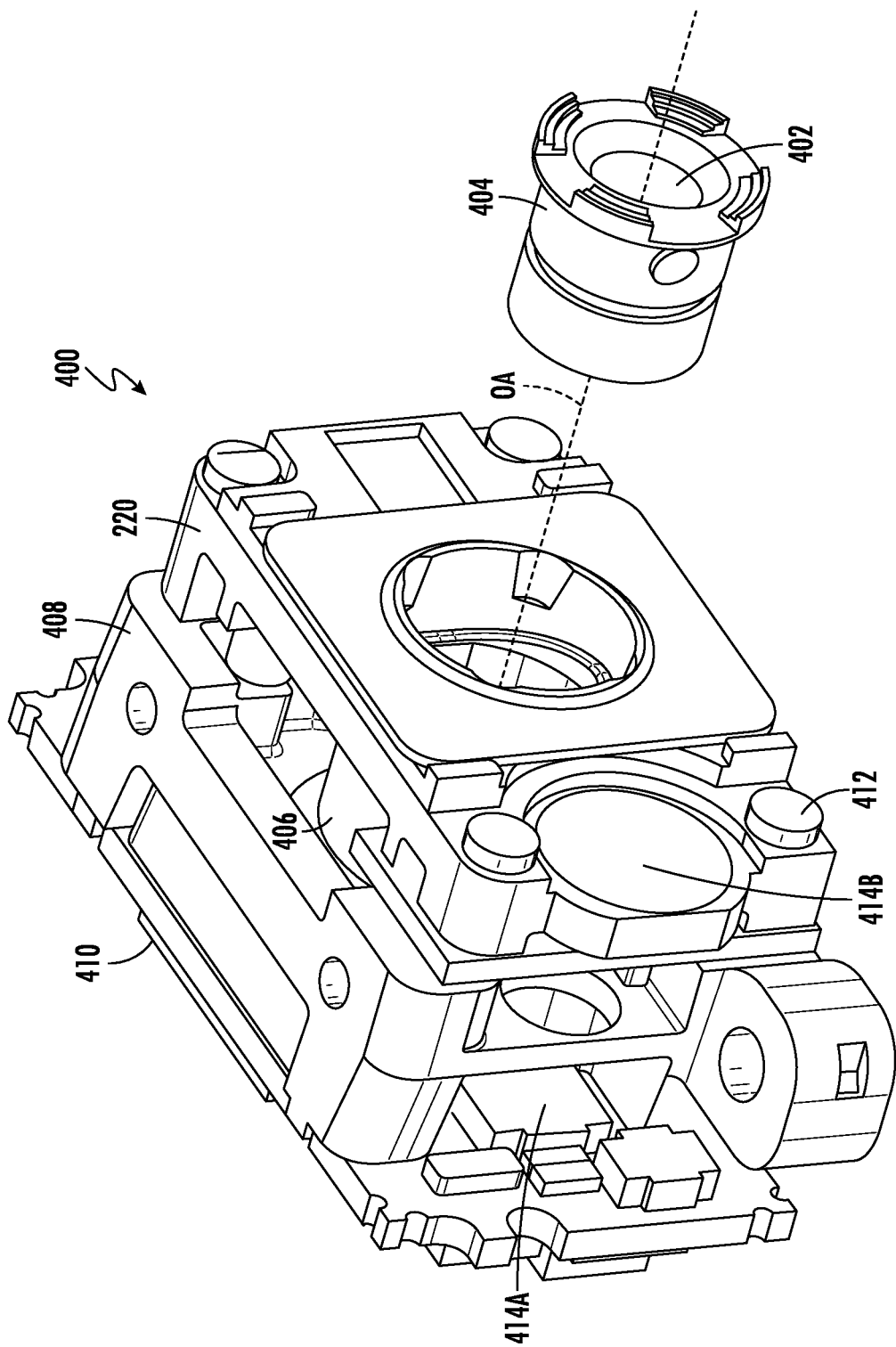
Figure 6:
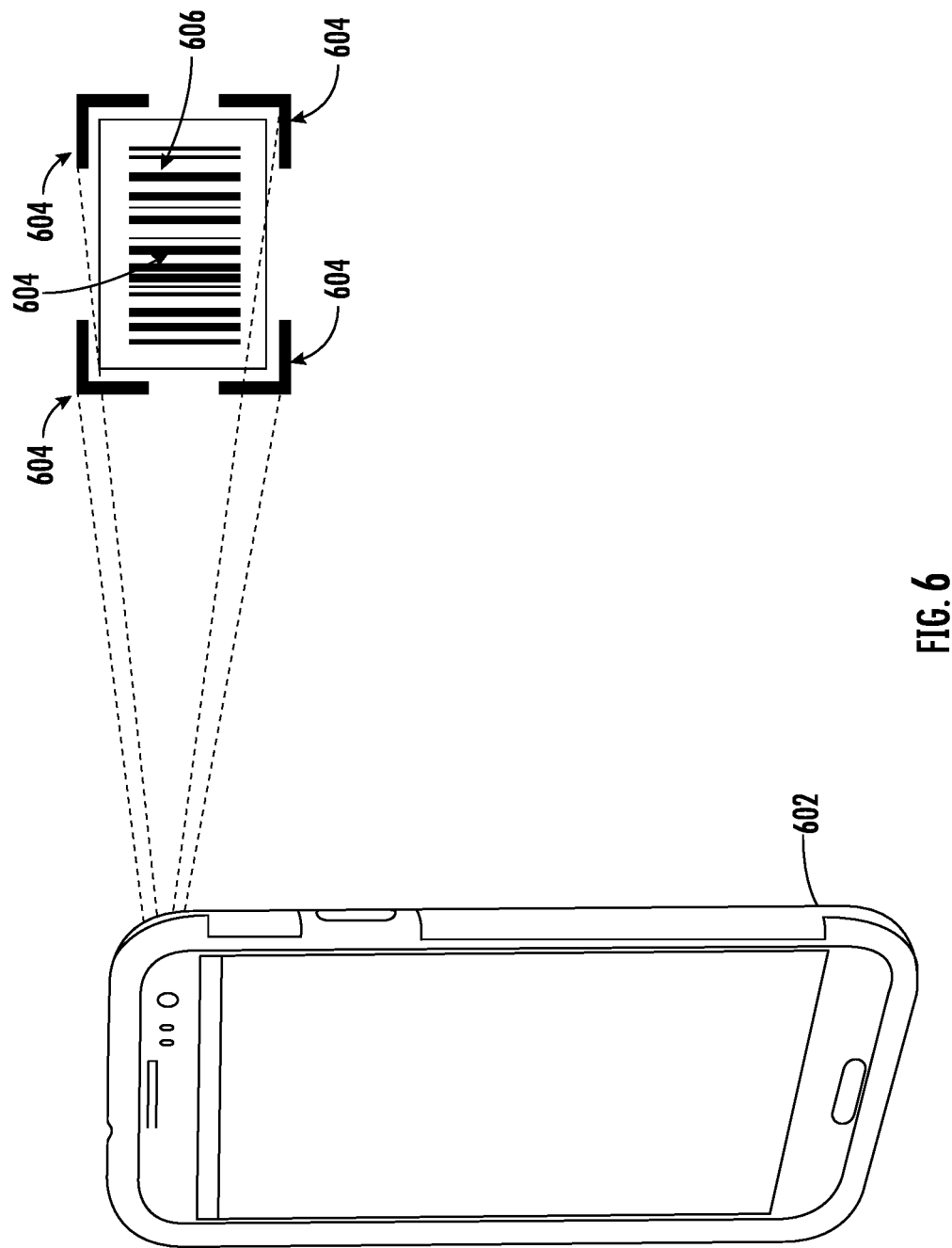
Figure 7:
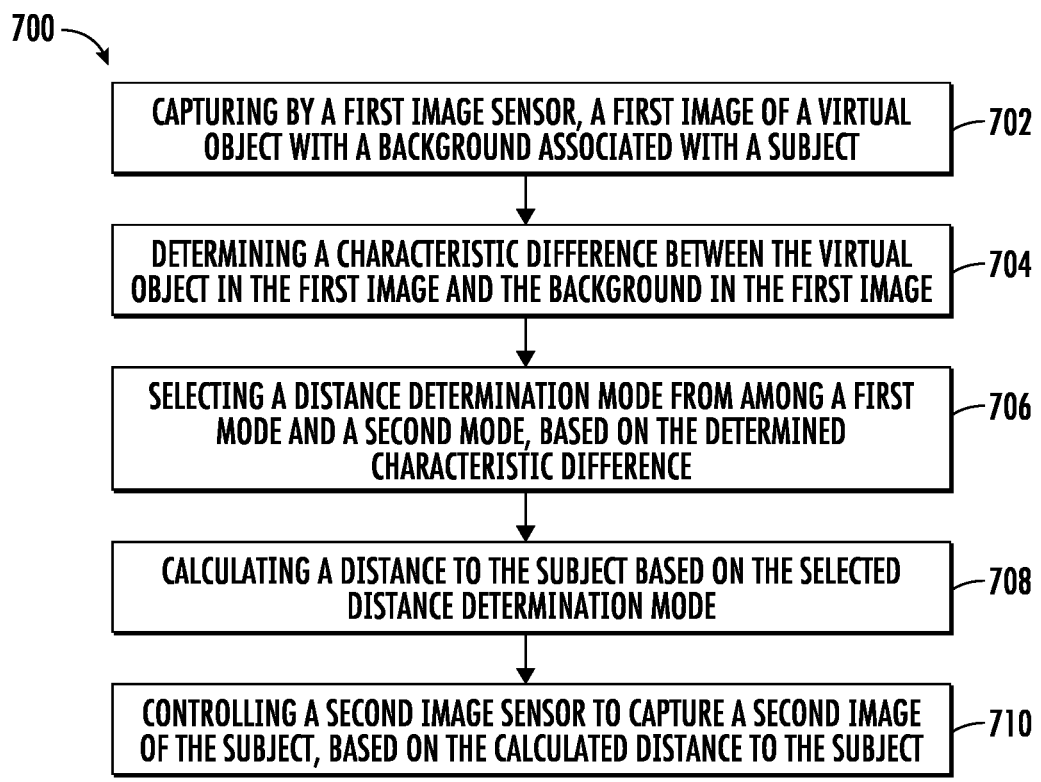
Figure 8:
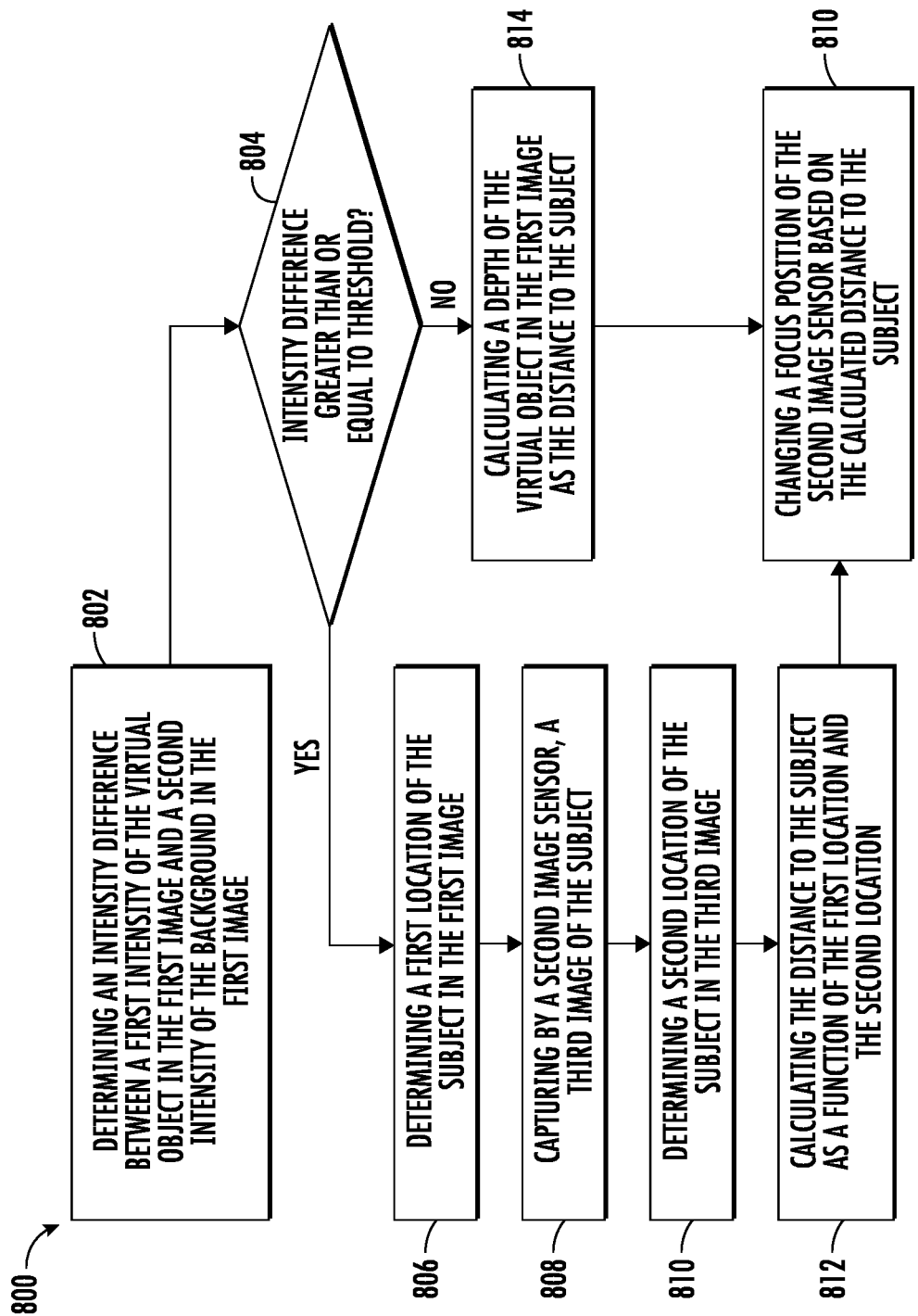
Figure 9A:
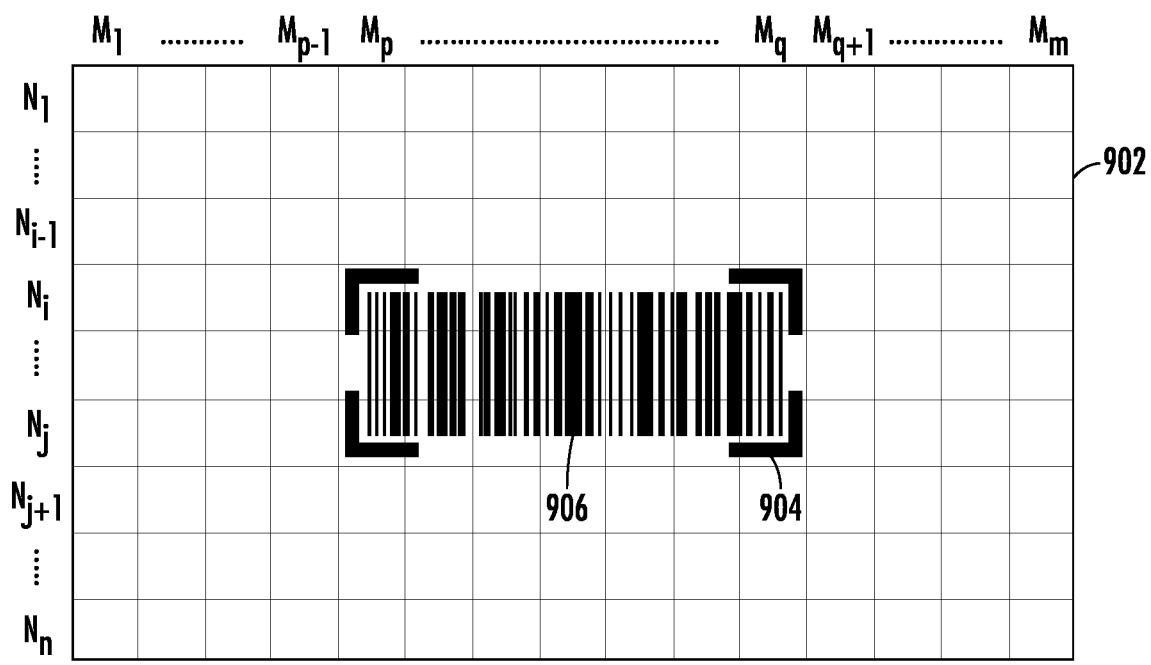
Figure 9B:
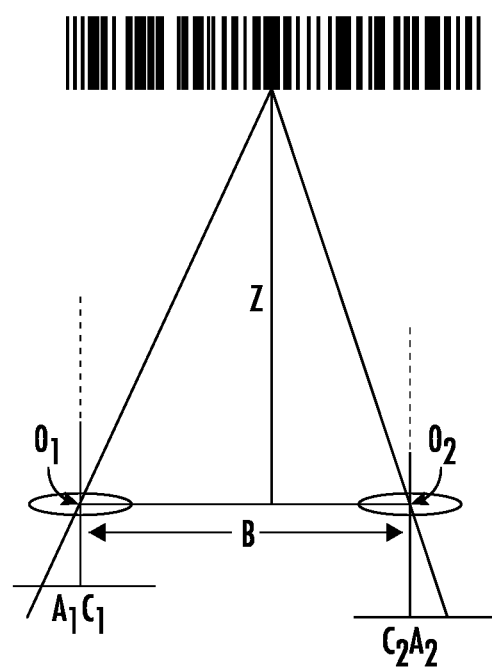
Figure 10:
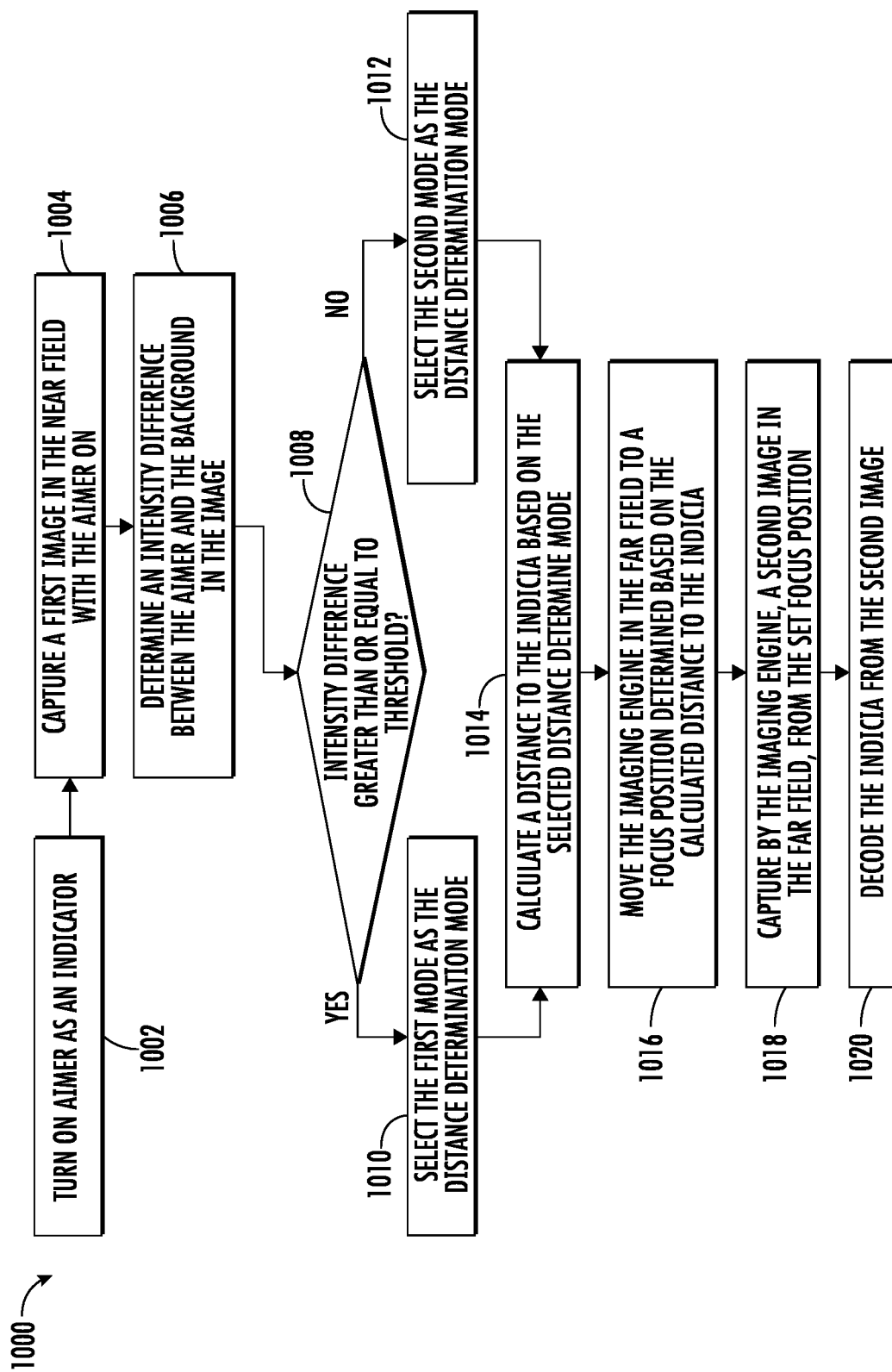

FIG. 4B illustrates a perspective assembly view of an image sensor of an example multi-sensor imaging apparatus, in accordance with an example embodiment of the present disclosure;

FIG. 5 illustrates another perspective assembly view of an image sensor of an example multi-sensor imaging apparatus, in accordance with an example embodiment of the present disclosure;

FIG. 6 illustrates an aimer projection by a multi-sensor imaging apparatus, in accordance with an example embodiment of the present disclosure;

FIG. 7 illustrates a flowchart depicting example operations of an imaging process, in accordance with an example embodiment of the present disclosure;

FIG. 8 illustrates a flowchart depicting example operations of a process for focus control in a multi-imager environment, in accordance with an example embodiment of the present disclosure;

FIG. 9A illustrates an exemplary image captured by a near-field image sensor for determining intensity difference between a visual object and background of a subject;

FIG. 9B illustrates an exemplary schema for measurement of distance to a subject in a scene; and FIG. 10 illustrates a flowchart depicting example operations of an imaging method with automatic focus selection based on image disparity, in accordance with an example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Imaging devices and systems have found application in areas that are more sophisticated and advanced than mere photography. There has been a constant demand for improvement in the imaging capabilities of these devices and systems to fit support the new capabilities. While some solutions have proposed minimizing errors and noise in existing configurations, other have aimed at adding more components to support new capabilities. One such solution involves the use of multiple image sensors for imaging different aspects of a scene. Each image sensor requires a different focus mechanism to capture a field of view with suitable clarity. The appropriate focus selection requires estimation of depth of a subject to be captured. However, owing to variation in imaging conditions, a depth estimation technique suitable for one type of imaging conditions may not be suitable for estimating depth of the subject in other type of imaging conditions. Thus, relying on only one type of depth estimation technique may not be sufficient to meet the imaging requirements in different imaging conditions. Such imaging devices and systems thus have limited operability for image capture.

Imaging apparatuses, such as indicia readers, are used in a variety of scenarios, each requiring a specific set of imaging requirements to be met so that an operation associated with the indicia reader such as symbol decoding may be successively carried out. Owing to a large variety of application areas for the imaging readers, there are a plethora of imaging conditions in which such apparatuses are used. The operability of these apparatuses is limited by the type of imaging conditions in which they are successfully capable of processing the captured image(s). Effective image processing requires efficient image capture which in turn is governed by several imaging factors such as focus, exposure, illumination and the like. Also, it is preferred for such apparatuses to perform the image capture and image processing within a time duration that is as short as possible. One way of shortening this time duration is to fasten up the image processing task by use of efficient algorithms and hardware. However, there is a limit to such upgradations considering the limited form factor, weight, and power supply available for such apparatuses. Thus for devices limited by form factor and/or size and available power supply, it is desired that the time taken to capture an image suitable for image processing, is as short as possible. Towards this end, it is desired that the time required in adjusting the optical components is low so that the image sensor is quickly focused onto the subject without the need of additional components.

Imaging apparatuses and systems utilize a visual object such as an aimer projection to determine the distance to the subject being imaged so that the image sensor can accordingly be focused onto the subject based on the determined distance to the subject. Oftentimes current scene conditions such as when being used in high ambient light environments, may lead to situations where the aimer projection may not be distinguishable from the background. As such, it becomes a challenge to correctly focus the imaging apparatus onto the subject being imaged. Even predefined focus positions/steps may not be beneficial as the direct search for a suitable focus may require additional time and processing which can delay the overall image capture process.

Some embodiments described herein relate to automatic focus selection in a multi-image sensor environment that includes multiple image sensors. Some embodiments described herein provide means for computation of the distance from an imaging system to a target or subject to determine an autofocus setting for one or more optical components of the multi-image sensor environment. Some embodiments utilize an aimer projection to center the subject or target along a desired axis. The aimer projection can be based on a structured light beam that projects a pattern onto one or more regions in the scene along the optical axis of the imaging system. This allows the subject or target to be in focus if the subject or target is close to a horizontal plane containing the optical axis. By way of example, some exemplary aimer pattern shapes can include without limitation, a laser beam (spot) coincident with the optical axis, a laser fan (line) coincident with the horizontal plane containing the optical axis, and two (e.g.) parallel, spaced-apart lines, in which one resides above and one below the horizontal plane containing the optical axis. When the subject or target is between the two lines, its resulting image on a corresponding image sensor is in-focus.

Some embodiments described herein utilize an image captured by a near field image sensor of an imaging engine to determine if the aimer projection is distinguishable from the background and performs selection of a distance determination mode based on intensity difference between the aimer as captured in the near-field image and the background as captured in the near-field image. Embodiments further perform estimation of the distance to a subject or a target as per the selected mode, whereby the focus selection of the imaging engine in the far-field is performed based on the estimated distance. Embodiments further utilize the focus adjusted far-field image sensor to capture an image of the subject or target for further processing. For example, the captured image may be used for decoding information encoded in the subject or target. In some example embodiments, the image captured by the focus adjusted far-field image sensor may be combined with the image captured by the near-field image to produce a stereoscopic image. Some embodiments may utilize multiple near-field image sensors and multiple far-field image sensors and the process for distance estimation may be extended as a cumulation of the image disparity computation for each pair of near-field image sensor and far-field image sensor. In some example embodiments, the processing for determining a characteristic difference may be averaged out for each near-field image sensor so that the trigger for selection of an appropriate distance determination mode is correctly determined. In some example embodiments, the processing for image disparity may as well be averaged for all near-field image sensors and far-field image sensors.

In some embodiments, one or more events may be triggered indicating circumstances where distance estimation may be required using a visual object such as the aimer projection. In this regard, one or more characteristic differences between the visual object and its background may be utilized to ascertain the illumination conditions in the scene. If the illumination conditions indicate that the visual object is distinguishable from the background by acceptable levels, a less stringent method of distance estimation may be relied upon to calculate the distance to a subject or target. For example, the intensity difference between pixels corresponding to the visual object in the near-field image and the pixels corresponding to the background, especially the pixels within immediate vicinity of the boundary pixels of the visual object, in the near-field image may be determined to ascertain the illumination conditions. In a similar manner, other parameters that aid in determining distinguishability of the visual object and the background may be utilized.

In some example embodiments, if the illumination conditions indicate that the visual object is not distinguishable from the background by acceptable levels, a process for determining image disparity between images of each image sensor of the imaging engine may be utilized. Towards this end, the near field image may be decoded to determine a location of the subject or target in the near-field image. Parallelly, another image from the far-field image sensor may be captured and decoded to determine a location of the subject or target in the far-field image. The image disparity may then be expressed in terms of the locations of the subject or target in the two images which in turn may be utilized to determine the distance to the subject or target. Accordingly, the corresponding focus position of the far-field image sensor may be determined, and the subject or target may be imaged from that focus position to capture a decodable image of the subject or target.

In such circumstances, the change to another distance estimation mode helps in saving considerable time and resource that would otherwise be required in direct search of the focus position. This improves the response time of the imaging apparatus for decoding information. Also, since the example embodiments require no unnecessary movement of the focus mechanism (such as the focus motor), the example embodiments result in significant power savings and/or reduction in noise in the captured image.

Some embodiments utilize disparity between images captured by stereo cameras of a multi-sensor imaging engine to calculate the distance to a subject. Obtaining the distance from image disparity requires the images from the stereo cameras to be rectified prior to determining the disparity. This normalizes the images, so they appear to be taken from parallel, matched cameras regardless of their actual extrinsic and intrinsic parameters. This allows disparity to be simply measured as the horizontal feature shift between the rectified images. From this horizontal disparity measurement of object features in the images, suitable techniques such as a trivial triangulation operation may be utilized to determine the distance to the subject. The determined distance may in turn be used for appropriate focus selection for one or more image sensors of the multi-sensor imaging engine.

Such embodiments provide effective focus selection using minimal additional computations. The operation of such embodiments captures images in a manner likely to result in successfully completing an image processing task, such as indicia or symbol scanning, while increasing the likelihood an image is captured within a desired operational time frame that includes data sufficient for successful processing. By way of implementation of various example embodiments described herein, an operational efficiency of the imaging apparatus is maintained or improved while addressing the challenges arising out of usage of multiple sensors and varying imaging conditions.

In some embodiments, some of the operations above may be modified or further amplified. Furthermore, in some embodiments, additional optional operations may be included. Modifications, amplifications, or additions to the operations above may be performed in any order and in any combination.

Definitions

The term "illumination" refers to one or more light rays produced by an illumination source within a defined field of view. In at least one example context, the illumination includes one or more illumination pulses produced by a corresponding illumination source. In some embodiments, an illumination is produced based on a "defined pulse frequency," which refers to a rate at which illumination pulses are produced by an illumination source. Additionally or alternatively, in some embodiments, an illumination is produced based on a "defined pulse phase," which refers to a period of activation for which an illumination source is producing a corresponding illumination. Thus, illumination period may refer to the time duration for which the illumination source remains activated corresponding to the illumination pulse.

The term "illumination source" (also referred to as "illuminator source" or "illuminator") refers to one or more light generating hardware, devices, and/or components configured to produce an illumination within a desired field of view. Non-limiting examples of an illumination source includes one or more light emitting diode(s) (LEDs), laser(s), and/or the like. One or more illumination sources may be dedicatedly or commonly available for each image sensor and/or projection optics of the multi-image sensor system.

The term "near-field illumination source" refers to an illumination source configured to produce an illumination for illuminating a near-field of view associated with a near-field image sensor. In at least one example context, the near-field illumination source is configured to produce an illumination in a wider field of view as compared to that of a far-field illumination source.

The term "far-field illumination source" refers to an illumination source configured to produce an illumination for illuminating a far-field of view associated with a far-field imager. In at least one example context, the far-field illumination source is configured to produce an illumination in a narrower field of view as compared to that of a near-field illumination source.

The term "near-field illumination" refers to a particular illumination produced by a near-field illumination source. In some embodiments, the near-field illumination is associated with illumination of a near field of view captured by a near-field image sensor.

The term "far-field illumination" refers to a particular illumination produced by a far-field illumination source. In some embodiments, the far-field illumination is associated with illumination of a far field of view captured by a far-field image sensor.

The term "imager" or "imaging module" refers to one or more components configured for capturing an image representing a particular field of view. In at least one example context, an imager includes at least one optical component (e.g., lens(es) and/or associated housing(s)) defining a particular field of view. Additionally or alternatively, in at least one example context, an imager includes an image sensor configured to output an image based on light that engages with the image sensor, such as via the optical components.

The term "image sensor" refers to one or more components configured to generate an image represented by a data object based on light incident on the image sensor. In some such example contexts, an image sensor converts light waves that interact with the image sensor into signals representing an image output by the sensor.

The term "near-field image sensor" refers to an image sensor configured for capturing an image of a near field of view. In at least one context, the near-field image sensor comprises at least one near-field optical component(s) defining the near field of view, and an electronic sensor. In at least one example context, the near-field image sensor may include a global shutter. In some example contexts, the near-field image sensor may include a rolling shutter. The term "near-field image" refers to electronic data generated by the near-field image sensor that embodies a captured representation of the scene in the near field of view.

The term "far-field image sensor" refers to an image sensor configured for capturing an image of a far-field of view. In at least one context, the far-field image sensor comprises at least one far-field optical component(s) defining the far field of view, and an electronic sensor. In at least one example context, the far-field image sensor may include a rolling shutter. In some example contexts, the far-field image sensor may include a global shutter. The term "far-field image" refers to electronic data generated by the far-field image sensor that embodies a captured representation of the scene in the far field of view.

The term "exposure period" or simply "exposure" refers to electronic data representing a length of time that an image sensor is configured for exposure to oncoming light. In at least one example embodiment, an image sensor of an imager is configured to utilize a variable exposure time that may be set to a particular exposure time value.

The term "visual object" refers to a projection pattern or object that is projected into the scene by the imager to aid in image capture. In at least one example embodiment, the visual object may be an aimer projection (hereinafter also referred to as aimer).

The term "subject" or "target" refers to one or more regions of interest in the scene being imaged. In some example embodiments, the subject may be optically distinguishable from the background of the scene being imaged.

The term "characteristic difference" refers to a difference between two regions in an image, expressed as a difference between an image characteristic of each region. Such image characteristic may include without limitation an intensity, sharpness, pixel count, and the like. In some example embodiments, the characteristic difference between two regions in an image may correspond to the intensity difference between the two regions in the image. In some example embodiments, the characteristic difference between two regions in an image may be determined by a pixel to pixel analysis of each such region.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

FIG. 1A illustrates a block diagram of an example multi-sensor imaging system 10 (hereinafter, also referred to as imaging system 10), in accordance with an example embodiment of the present disclosure. The multi-sensor imaging system 10 includes an imaging engine 100 communicatively coupled with a controller 20, a communication interface 40, an activation component 60, and one or more peripheral components 80. In some example embodiments, the imaging system 10 may include fewer or more components than shown in FIG. 1A. The imaging system 10 is configured for capturing one or more images of a target in one or more fields of views using one or more illumination sources. The imaging system 10 processes the one or more images to execute one or more image processing tasks such as indicia reading. Accordingly, in some example embodiments of the disclosure, the imaging system 10 may be embodied in part or full as an indicia or symbol reader or a handheld device capable of reading indicia and similar symbols. One example embodiment of the imaging system 10 is illustrated in FIG. 2, details of which will be described in the subsequent portions of the disclosure.

Controller 20 may be configured to carry out one or more control operations associated with the imaging system 10. For example, controller 20 may control the imaging engine 100 to cause image capture of a target in a field of view of the imaging engine 100. Additionally, the controller 20 may process the captured images to carry out one or more image processing tasks. The controller 20 may be embodied as a central processing unit (CPU) comprising one or more processors and a memory. In some example embodiments, the controller 20 may be realized using one or more microcontroller units (MCU), as one or more of various hardware processing means such as a coprocessor, a microprocessor, a digital signal processor (DSP), a processing element with or without an accompanying DSP, or various other processing circuitry including integrated circuits such as, for example, an ASIC (application specific integrated circuit), an FPGA (field programmable gate array), a hardware accelerator, a special-purpose computer chip, or the like. In some embodiments, the processor of the controller 20 may include one or more processing cores configured to operate independently. A multi-core processor may enable multiprocessing within a single physical package. Additionally, or alternatively, the processor may include one or more processors configured in tandem via the bus to enable independent execution of instructions, pipelining and/or multi-threading.

The memory may be non-transitory and may include, for example, one or more volatile and/or non-volatile memories. For example, the memory may be an electronic storage device (for example, a computer readable storage medium) comprising gates configured to store data (for example, bits) that may be retrievable by a machine (for example, a computing device like the processor). The memory may be configured to store information, data, content, applications, instructions, or the like, for enabling the apparatus to carry out various functions in accordance with an example embodiment of the present invention. For example, the memory could be configured to buffer data for processing by the processor. Additionally, or alternatively, the memory could be configured to store instructions for execution by the processor.

The processor (and/or co-processors or any other processing circuitry assisting or otherwise associated with the processor) may be in communication with the memory via a bus for passing information among components of the imaging system 10. The processor may be configured to execute instructions stored in the memory or otherwise accessible to the processor. Additionally, or alternatively, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. The processor may include, among other things, a clock, an arithmetic logic unit (ALU) and logic gates configured to support operation of the controller 20.

The communication interface 40 may comprise input interface and output interface for supporting communications to and from the imaging system 10. The communication interface 40 may be any means such as a device or circuitry embodied in either hardware or a combination of hardware and software that is configured to receive and/or transmit data to/from a communications device in communication with the imaging system 10. In this regard, the communication interface 40 may include, for example, an antenna (or multiple antennae) and supporting hardware and/or software for enabling communications with a wireless communication network. Additionally or alternatively, the communication interface 40 may include the circuitry for interacting with the antenna(s) to cause transmission of signals via the antenna(s) or to handle receipt of signals received via the antenna(s). In some environments, the communication interface 40 may alternatively or additionally support wired communication. As such, for example, the communication interface 40 may include a communication modem and/or other hardware and/or software for supporting communication via cable, digital subscriber line (DSL), universal serial bus (USB) or other mechanisms.

The activation component 60 may include hardware, software, firmware, and/or a combination thereof, configured to indicate initiation (and/or termination) of desired functionality by the user. For example, the activation component 60 may transmit an activation signal to cause the controller 20 to begin operation of the imaging engine 100, for example to begin illumination by one or more illumination sources, and/or capture by image sensors, one or more images. Additionally or alternatively, the activation component 60 may transmit a deactivation signal to the controller 20 to terminate the corresponding functionality, for example to cease scanning via the image sensor(s). In some embodiments, the activation component 60 is embodied by one or more buttons, triggers, and/or other physical components provided in or on the body of a chassis. For example, in at least one example context, the activation component 60 is embodied by one or more "trigger" components that, when engaged by an operator (e.g., when an operator squeezes the trigger), transmits a signal to the controller 20 to initiate corresponding functionality. In some such embodiments, the activation component may transmit a deactivation signal to the controller 20 to cease such functionality when the component is disengaged by the operator (e.g., when the operator releases the trigger). Alternatively or additionally, in at least some embodiments, the activation component 60 is embodied without any components for direct engagement by an operator. For example, when the imaging system 10 is embodied as an imaging apparatus, the activation component 60 may be embodied by hardware and/or software, or a combination thereof, for detecting the imaging apparatus has been raised and/or positioned to a predefined "scanning" position, and/or lowered from that position to trigger deactivation. Alternatively or additionally, the activation component 60 may be embodied as a user interface element of the imaging system 10. In such embodiments, the activation component 60 embodied as a user interface element may be configured to receive an input from the user on a user interface and in turn transmit a corresponding command to the controller 20.

The one or more peripheral components 80 include other structural and functional elements of the imaging system 10 such as for example a display device, a user interface, a housing, a chassis, power source and the like. One or more of the peripheral components 80 may be controlled by the controller and may operate as per instructions or control provided by the controller 20.

FIG. 1B illustrates an example multi-sensor imaging engine (hereinafter, also referred to as "imaging engine") in accordance with an example embodiment of the present disclosure. Specifically, as illustrated, the example multi-sensor imaging engine is embodied by a multi-sensor imaging engine 100. The multi-sensor imaging engine 100 includes a plurality of image sensors, for example, a near-field image sensor and a far-field image sensor, configured for capturing image data objects in a near field of view associated with the near-field image sensor and a far field of view associated with the far-field image sensor, respectively. In at least one example context, the multi-sensor imaging engine 100 is configured for capturing images for purposes of indicia reading at different ranges, such as a close-range using a near-field image sensor and a far-range using a far-field image sensor.

As illustrated, the multi-sensor imaging engine 100 includes near-field image capture optics 104A. The near-field capture optics 104A may be embodied by one or more lens(es) and/or other optical components configured to enable light to transverse through and interact with a corresponding image sensor, specifically the near-field image sensor 102A. In this regard, the near-field image capture optics 104A may define a particular field of view that may be captured by a near-field image sensor 102A. In some embodiments, the near-field image capture optics 104A defines a near field of view associated with a first focal range, such that objects located at and/or within a determinable offset from the first focal range may be clear in images captured by the near-field image sensor 102A.

Additionally as illustrated, the multi-sensor imaging engine 100 includes far-field image capture optics 104B. The far-field image capture optics 104B may be embodied by one or more lens(es) and/or other optical components configured to enable light to transverse through and interact with a corresponding image sensor, specifically the far-field image sensor 102B. In this regard, the far-field image capture optics 104B may define a second field of view that may be captured by the far-field image sensor 102B. In some embodiments, the far-field image capture optics 104B defines a far field of view that is associated with a second focal range, such that objects located at and/or within a determinable offset from the second focal range may be clear in images captured by the far-field image sensor 102B. In some such embodiments, the near field of view is wider than the far field of view, such that the captured data represents more of the environment within view of the multi-sensor imaging engine 100. The far field of view may be narrower than the near field of view and focused on a further range to enable clearer capture of objects located at a greater range than objects that can be captured clearly in the near field of view.

In some example embodiments, the near-field imaging sensor 102A may include a global shutter to provide enhanced motion tolerance. The near field imaging sensor 102A may use a large Field of View (FOV), the large FOV enabling applications such as but not limited to optical character recognition (OCR), image reconstruction, machine learning etc. In some embodiments, the far field sensor 102B may include a rolling shutter. The far field image sensor 102B uses a small FOV to improve the sampling of far field. Additionally, each of the near-field image sensor 102A and the far-field image sensor 102B may have an associated focus mechanism. The focus mechanism may include a focus scheme that controls movement of one or more focus lenses along an optical axis direction of an image sensor (102A or 102B). Towards this end, in some embodiments, the focus scheme may include one or more motion actuators, for example, stepper motors or piezoelectric actuators. In some example embodiments, the focus scheme may be inbuilt in the lenses for example in variable (e.g. liquid) lenses.

The focus scheme may provide a plurality of discrete focus positions in each field of view and the motor may move the focus optics of a particular image sensor to each of the discrete focus positions to exhibit the focus mechanism. For example, in some example embodiments, to change the focusing of the far field image sensor 102B, the corresponding motor may move the associated focus optics of the far field imaging sensor 102B to three discrete focus positions in the far field. The operation of each of the focus mechanisms may be controlled by a processing component such as the controller 20 of FIG. 1A or the processor 202. In some example embodiments, where the lenses have inbuilt focus scheme, the processing component may control the focusing of the lenses using estimated distance data.

In some embodiments, for example as illustrated, each image sensor (or a subset thereof) is associated with one or more components for producing an illumination configured for illuminating the field of view defined by the image sensor. For example, as illustrated, the multi-sensor imaging engine 100 additionally comprises the near-field illumination source 106A and corresponding near-field projection optics 108A. The near-field illumination source 106A is configured to produce light in the optical axis direction of the near-field projection optics 108A. This light is refracted through the near-field projection optics 108A to produce a near-field illumination, which may be produced in a desired pattern based on the configuration and design of the near-field projection optics 108A. In this regard, the illumination produced by light exiting the near-field projection optics 108A may illuminate a particular field of view, such as the near field of view capturable by the near-field image sensor 102A.

Similarly, the multi-sensor imaging engine 100 additionally comprises the far-field illumination source 106B and corresponding far-field projection optics 108B. The far-field illumination source 106B is configured to produce light in the direction of the far-field projection optics 108B. This light is refracted through the far-field projection optics 108B to produce a far-field illumination, which may be produced in a desired pattern based on the configuration and design of the far-field projection optics 108B. In this regard, the far-field illumination may illuminate a particular field of view, such as the far field of view capturable by the far-field image sensor 102B.

Additionally in some embodiments, the multi-sensor imaging engine 100 further comprises an aimer illumination source 110. The aimer illumination source 110 is configured to produce light in the direction of the aimer projection optics 112. For example, the aimer illumination source comprises one or more laser diodes and/or high intensity LED(s) configured to produce sufficiently powerful and/or concentrated light. The light is refracted through the aimer projection optics 112 to produce an aimer illumination, which may be produced in a desired pattern based on the configuration and design of the aimer projection optics 112. In one example context, for purposes of barcode scanning for example, the aimer pattern may be produced as a laser line pattern, a laser dot pattern, as two parallel lines enclosing a finite region in between and the like.

The multi-sensor imaging engine 100 further comprises a protective window 114. The protective window 114 comprises one or more optical components configured to enable produced light to exit the engine 100, and incoming light to be received for example, through the image capture optics 104A and 104B to interact with the corresponding image sensors 102A and 102B.

It should be appreciated that, in other embodiments, a multi-sensor imaging engine may include any number of image capture optics, image sensors, illumination sources, and/or any combination thereof. In this regard, the imaging engine 100 may be extended to capture any number of field of views, which may each be associated with a corresponding illuminator designed for specifically illuminating a corresponding field of view. One or more of the illumination source(s) may negatively affect operation of another illuminator. In such circumstances, when one such illumination source is active, the negatively affected image sensor may be activated between illumination pulses of the illumination source as described herein. Such operation may be implemented for any combination(s) of illumination source and image sensor.

In some embodiments, the multi-sensor imaging engine 100 includes one or more processing components (e.g., a processor and/or other processing circuitry) for controlling activation of one or more components of the multi-sensor imaging engine 100. For example, in at least one example embodiment, the multi-sensor imaging engine 100 includes a processor configured for timing the illumination pulses of the near-field illumination source 106A and/or far-field illumination source 106B, and/or controlling the exposing of the near-field image sensor 102B and/or far-field image sensor 102A. In some such contexts, the processor is embodied by any one of a myriad of processing circuitry implementations, for example as a FPGA, ASIC, microprocessor, CPU, and/or the like. In at least some embodiments, the processor may be in communication with one or more memory device(s) having computer-coded instructions enabling such functionality when executed by the processor(s). In some embodiments, it should be appreciated that the processor may include one or more sub-processors, remote processors (e.g., "cloud" processors) and/or the like, and/or may be in communication with one or more additional processors for performing such functionality. For example, in at least one embodiment, the processor may be in communication, and/or operate in conjunction with, another processor within an imaging apparatus, for example the processor 202 as depicted and described with respect to FIG. 2.

FIG. 2 illustrates an example multi-sensor imaging apparatus 200, in accordance with an example embodiment of the present disclosure. As illustrated, the multi-sensor imaging apparatus 200 comprises an apparatus chassis 210 for housing the various components of the apparatus. In this regard, it should be appreciated that the apparatus chassis may be embodied in any of a myriad of chassis designs, using any of a myriad of materials, and/or the like, suitable to position the various components of the multi-sensor imaging apparatus 200 for operation. In at least one example context, the apparatus chassis 210 may be embodied as a handheld apparatus chassis, wearable chassis, and/or the like.

The multi-sensor imaging apparatus 200 comprises the multi-sensor imaging engine 100 as described above with respect to FIG. 1B. The multi-sensor imaging apparatus 200 further comprises a processor 202. The processor 202 (and/or any other co-processor(s) and/or processing circuitry assisting and/or otherwise associated with the processor 202) may provide processing functionality to the multi-sensor imaging apparatus 200. In this regard, the processor 202 may be embodied in any one of a myriad of ways as discussed with respect to the controller 20 of FIG. 1A.

In some example embodiments, the processor 202 is configured to provide functionality for operating one or more components of the multi-sensor imaging apparatus 200. For example, the processor 202 may be configured for activating the far-field illumination source 106B, the near-field illumination source 106A, and/or the aimer illumination source 110. Additionally or alternatively, in some embodiments, the processor 202 is configured for activating the near-field image sensor 102A and/or far-field image sensor 102B to expose the corresponding image sensor, and/or for reading out the captured data to generate an image based on the data captured during exposure. Additionally or alternatively, in some embodiments, the processor 202 is configured to process the captured image(s), for example based on one or more image processing task(s). In one such example context, the processor 202 is configured to perform an attempt to detect and decode visual indicia(s), such as 1D and/or 2D barcodes, from a captured image. In this regard, the processor 202 may be configured to utilize a visual indicia parsing algorithm and/or a visual indicia decoding algorithm to provide such functionality.

Additionally or alternatively, optionally in some embodiments, the multi-sensor imaging apparatus 200 further include activation component 206. The activation component 206 may be embodied in a myriad of ways as discussed with respect to the activation component 60 of FIG. 1A.

Additionally or alternatively, optionally in some embodiments, the imaging apparatus 200 further includes a display 208. The display 208 may be embodied by a LCD, LED, and/or other screen device configured for data provided by one or more components of the apparatus 200. For example, in some embodiments, the display 208 is configured for rendering a user interface comprising text, images, control elements, and/or other data provided by the processor 202 for rendering. In some embodiments, for example, the display 208 is embodied by an LCD and/or LED monitor integrated with the surface of the apparatus chassis 210 and visible to an operator, for example to provide information decoded from a barcode and/or associated with such information decoded from a barcode. In one or more embodiments, the display 208 may be configured to receive user interaction, and/or may transmit one or more corresponding signals to the processor 202 to trigger functionality based on the user interaction. In some such embodiments, the display 208 to provide user interface functionality embodying activation component 206, for example to enable an operator to initiate and/or terminate scanning functionality via interaction with the user interface.

Additionally or alternatively, optionally in some embodiments, the imaging apparatus 200 further includes a memory 204. The memory 204 may provide storage functionality, for example to store data processed by the multi-sensor imaging apparatus 200 and/or instructions for providing the functionality described herein. In some embodiments, the processor 202 may be in communication with the memory 204 via a bus for passing information among components of the apparatus, and/or for retrieving instructions for execution. The memory 204 may be embodied in a myriad of ways discussed with reference to the controller 20 of FIG. 1A. The memory 204 may be configured to store information, data, content, applications, instructions, or the like, for enabling the imaging apparatus 200 to carry out various functions in accordance with some example embodiments. In some embodiments, the memory 204 includes computer-coded instructions for execution by the processor 202, for example to execute the functionality described herein and/or in conjunction with hard-coded functionality executed via the processor 202. For example, when the processor 202 is embodied as an executor of software instructions, the instructions may specially configure the processor 202 to perform the algorithms and/or operations described herein when the instructions are executed.

In some example embodiments of the present disclosure, processor 202 and memory 204 may together be embodied as an imaging control apparatus and may therefore be fixed or detachably coupled with the imaging apparatus 200 or may be partially or completely outside the imaging apparatus 200. In some embodiments, the imaging control apparatus may be embodied as an integrated circuit that is operatively coupled with the imaging apparatus 200.

FIG. 3 illustrates a visualization of the field of views capturable by an example multi-sensor image apparatus. For example, as illustrated FIG. 3 depicts the near field of view 302 and the far field of view 304 capturable by the multi-sensor imaging apparatus 200. As illustrated, the near field of view 302 is broader than the far field of view, such that more of the environment may be captured within the near field of view 302 than the far field of view 304.

Further, as illustrated, the far field of view 304 extends further than the near field of view 302. In this regard, the narrow nature of the far field of view 304 may enable capture of more detailed representations of a particular portion of the environment as compared to the near field of view 302. In some embodiments, the near field of view 302 and far field of view 304 are capturable by corresponding near field image sensor and a corresponding far field image sensor of the multi-sensor imaging apparatus 200. The near field of view 302 may be associated with a near focal range at a particular distance from the corresponding image sensor in the multi-sensor imaging apparatus 200. Additionally or alternatively, the far field of view 304 may be associated with a far focal range at another distance from the corresponding image sensor in the multi-sensor imaging apparatus 200. In this regard, the near field focal range may be closer than the far-field focal range, such that objects further from the multi-sensor imaging apparatus 200 are in better focus when captured via the far-field image sensor, allowing for an extended range as compared to the near field image sensor.

The multi-sensor imaging apparatus 200 may be configured for providing an illumination specifically for illuminating each of the field of views 302 and 304. In this regard, an illumination source may be specifically designed to match the field of view of a corresponding image sensor, such that the illumination appropriately illuminates the corresponding field of view without overfill or underfill. Utilizing another illumination source to produce an illumination and capturing during the non-corresponding image sensor during the illumination, may result in overfilling (e.g., when capturing using a far-field image sensor during a near-field illumination pulse), and/or underfilling (e.g., when capturing using a near-field image sensor during a far-field illumination pulse) that may affect the quality of the data in the captured image, such as due to having too much illumination and/or not enough as described. In this regard, the near-field illumination may be produced so as to substantially or entirely illuminate the near field of view 302. The near-field illumination may be produced in accordance with an illumination pattern that sufficiently illuminates the entirety of the near-field of view 302 for capturing.

The far-field illumination may be produced so as to substantially or entirely illuminate the far field of view 304. The far-field illumination may be produced in accordance with an illumination pattern that sufficiently illuminates the entirety of the far field of view 304 for capturing by a corresponding far-field image sensor. The far-field illumination may illuminate only a percentage of the near-field of view 302, for example a center percentage (e.g., 25%, 50%, or the like) of the near field of view 302.

The near field illumination, the far-field illumination and the aimer illumination may be synchronized with respect to each other in a manner that ensures zero or minimal interference between the associated image sensors. In this regard, the corresponding illumination source may be suitably controlled by the controller 20/processor 202 to ensure efficient image capture.

Some example embodiments described herein provide a multi-image sensor imaging apparatus (hereinafter also referred to as apparatus) having an automatic focus selection mechanism based on image disparity between images of the multiple image sensors of the apparatus. FIG. 4A illustrates a perspective view of an example multi-image sensor imaging apparatus, in accordance with an example embodiment of the present disclosure. A multi-sensor imaging apparatus 400 may have multiple image sensors, each image sensor of the apparatus 400 may have associated optical elements and each image sensor along with its associated optical elements may constitute an individual imaging assembly. For the sake of brevity, the multi-sensor imaging apparatus 400 has been shown to have two image sensor assemblies 400A and 400B. However, it may be contemplated that within the scope of this disclosure, there may be more of such image sensor assemblies in the multi-sensor imaging apparatus 400 depending on the requirements. Apparatus 400 further comprise integrated illumination-optics 400A1 and 400B1 for respective one of the image sensors 400A and 400B. In some example embodiments, the image sensor assembly 400A may be suitable for imaging in the near field of view of the apparatus 400 while the image sensor assembly 400B may be suitable for imaging in the far field of view of the apparatus 400. One or more components may be shared by each of the sensor assemblies 400A and 400B and may therefore be provided as an integrated component in the apparatus 400. For example, an integrated aimer optics may jointly be provided for both the sensor assemblies 400A and 400B. In such configurations, the integrated component may be provided on an imaging assembly corresponding to either of the image sensor assemblies 400A and 400B.

Each image sensor of the apparatus 400 may have associated optical elements and each image sensor along with its associated optical elements may constitute an individual imaging assembly. FIG. 4B illustrates a perspective assembly view of one image sensor of the example multi-sensor imaging apparatus 400, in accordance with an example embodiment of the present disclosure. The exemplary imaging assembly 400A illustrated in FIG. 4B may include imaging optics 402 disposed or contained within a generally cylindrical barrel 404. The imaging optics 402 may include one or more optical lenses for focusing incoming radiation onto an image sensor 410 for image formation. The barrel 404 may be slidably disposed or contained within a generally cylindrical sleeve 406. Sleeve 406 may be secured to an imaging assembly body 408 which may provide a platform for, amongst other items, the image sensor 410. When barrel 404 is moved axially within sleeve 406, the imaging optics 402 may be brought in and out of focus with the image sensor 410. Imaging optics 402 may therefore be positioned to a precise desired location within sleeve 406 in order to bring the target in focus with the image sensor. Depending on location of the target with respect to the imaging assembly 400, there may be defined a plurality of focus positions for the imaging optics 402 for bringing the target in focus with the image sensor 410. As discussed previously, a controller may control movement of the imaging optics 402 to position it at one of the plurality of focus positions depending on the location of the target relative to the imaging assembly 400. The barrel 404 is inserted into sleeve 406 and rotated to change the position of optics 402 along the optical axis OA to precisely locate optics 402 at a desired location relative to image sensor 410. The barrel 404 may be moved within the sleeve 406 utilizing an image optics controller (not shown in FIG. 4). In some example embodiments, the imaging assembly 400A may be suitable for imaging in the near field of view of the imaging apparatus 400. In such configurations, movement of the barrel 404 may be restricted fully or partially, and the focus mechanism may be absent. In some such configurations, the barrel 404 may be absent and a stationary lens may be provided in the sleeve 406. The exemplary imaging assembly 400 may include one or more light sources 412 for illuminating a corresponding field of view of the scene including the target. Additionally or optionally, in some example embodiments, the imaging assembly 400 may include an aimer illuminator 414A and associated aimer optics 414B for projecting an aimer as a visual object onto the scene being imaged. The aimer illuminator 414A may include one or more aimer LEDs which may be controlled by a controller to produce illumination required for projecting an aimer as an indicator.

FIG. 5 illustrates another perspective assembly view of an image sensor of an example multi-sensor imaging apparatus 400, in accordance with an example embodiment of the present disclosure. Specifically, FIG. 5 illustrates an exploded perspective view 500 of the imaging assembly 400B comprising an illumination module, an optional aimer module, and an imaging module. It may be contemplated that other image sensors of the example multi-sensor imaging apparatus may have a similar structure as the imaging assembly illustrated in FIG. 5. The illumination module is configured for projecting an illumination pattern and includes an imaging illumination light source assembly 512A that may include one or more light sources, according to various illustrative embodiments. Imaging illumination light source assembly 512A may further include one or more light source banks, each comprising one or more light sources, for example. Such light sources can illustratively include light emitting diodes (LEDs), in an illustrative embodiment. LEDs with any of a wide variety of wavelengths and filters or combination of wavelengths or filters may be used in various embodiments. Other types of light sources may also be used in other embodiments. The light sources may illustratively be mounted to a printed circuit board. This may be the same printed circuit board on which an image sensor 510 may illustratively be mounted.

In various illustrative embodiments, illumination module may include an imaging illumination optical assembly 512B, as is shown in the embodiment of FIG. 5. Imaging illumination optical assembly 512B, or other parts of illumination module, may include any of a variety of optical elements such as one or more lenses, one or more diffusers, one or more mirrors, and/or one or more prisms, as illustrative examples. Imaging illumination optical assembly 512B may thereby focus, diffuse, shape, or otherwise project illumination toward a target area. Illumination module may thereby project an illumination pattern toward or onto a target area. An illumination pattern thus projected may include any type or pattern of illumination in different embodiments.

The aimer module may be provided optionally, especially when the imaging assembly 400A does not have one such aimer module. The aimer module may be configured for projecting an aiming pattern and includes an aimer light source 514A and aimer optical elements 514B and 514C. For example, aimer light source 514A may include one or more light emitting diodes (LEDs) and/or aiming lasers, while aimer optical elements may include one or more apertures 514C, and one or more lenses 514A, which may be a spherical lens, an aspheric lens, a cylindrical lens, or an anamorphic lens, for example. The aimer module projects light from aimer light source 514A through aperture 514C and optics 514B to provide an aiming pattern onto a target to assist in capturing an image of the target with image sensor 510. The aimer light source 514A may project light forward into a hemispherical pattern, for example. The front surface of an LED light source may contain an integrated convex lens surface designed to reduce the angular divergence of the light leaving the LED. As much of this light as possible is directed through the aimer aperture 514C and directed to further pass through the aimer optics 514B. The aimer optics 514C may be designed to create an image of the aimer aperture onto the indicia located in the target. The aimer module may in another implementation include a laser and a laser collimator, for example.

The imaging module is configured for image capture and includes an image sensor 510 and an imaging optics assembly 504 operative for focusing an image onto the image sensor 510. The image sensor 510 may include an array of pixels adapted to operate in a global shutter or full frame shutter, mode or alternately operate in a rolling shutter mode. It may be a color or monochrome 2D solid state image sensor implemented in any of CCD, CMOS, NMOS, PMOS, CID CMD, back-illuminated technologies. The image sensor may be either a progressive or interleaved imager. The image sensor may contain an array of light sensitive photodiodes (or pixels) that convert incident light energy into electric charge. An exemplary image sensor may use a mono color image sensor that may include a filter element defining color sensitive pixel elements dispersed throughout an array of monochrome pixels. An exemplary image sensor device may include an image sensor processor, an analog to digital converter (ADC) and other circuitry. The imaging optics assembly 504 may include optical components such as lenses for focusing light from a target onto the image sensor 510.

The modules of the imaging assembly 500 may operate in a synchronized manner to execute an image processing task. For example, imaging illumination module may project the illumination pattern while imaging module exposes a first frame of image data during an illuminated exposure period. The aimer module may provide an indicator to a user of the multi-image sensor apparatus to place the target within the indicated region for efficient image capture.

FIG. 6 illustrates an aimer projection by a multi-sensor imaging apparatus, in accordance with an example embodiment of the present disclosure. In some example embodiments, the multi-sensor imaging apparatus may be a smartphone 602 having multiple imaging assemblies such as the imaging assemblies 400 and/or 500. In this regard. the smartphone 603 may have an aimer module integrated with the smartphone or available as an add-on module to help target an indicia for scanning.

The aimer module includes a projection module for forming the light beam from the light source module into an aiming pattern (i.e., pattern) and for projecting the pattern onto a target (e.g., a decodable indicia). The projection module may include a lens (or lenses), an aperture, and/or a diffractive optical element (DOE) to help form the pattern. In some embodiments, the projection module may include a mirror (or mirrors) to redirect and/or shape the light beam/pattern. The pattern created by the aimer projection module provides feedback regarding the camera's field of view so that when the pattern 604 is projected onto a target (e.g., a barcode 606), a user may understand what is being imaged and how that image will be aligned. To this end, the pattern may indicate the center of the camera's field of view, the edges of the camera's field of view, and/or the corners of the camera's field of view. Thus, patterns may include without limitation, for example: a cross, a box, a line, or a corner. In a possible embodiment, the pattern may be utilized to ascertain illumination conditions of the scene so that a suitable distance determination mode may be selected for focusing of the imaging apparatus. For example, the focus of a pattern may provide information regarding the camera's ability to focus the barcode.

FIG. 7 illustrates a flowchart depicting example operations of imaging process 700, in accordance with an example embodiment of the present disclosure. Process 700 may be implemented by the imaging system 10 or imaging apparatus 200 described with reference to FIG. 1A and FIG. 2. The process 700 includes at 702, capturing by a first image sensor, a first image of a visual object with a background associated with a subject. In some example embodiments where the subject is placed at a distance from the imaging system, it is essential to determine the imaging conditions before a decodable image is captured for further image processing. In this regard, the first image sensor may be sensor suitable for imaging in the near-field of view. The first image sensor may capture a near field of view that includes a visual object such as an aimer projected by a projection apparatus, the target or the subject, and background of the target or subject. In an example context as illustrated in FIG. 6, the first image sensor may capture an image of the projected pattern 604 along with the target barcode 606 and background of the target barcode 606.

The process 700 further includes at 704, determining a characteristic difference between the visual object in the first image and the background in the first image. The image captured at 702 is processed to detect the visual object and its background. Subsequently, an analysis for example, a pixel by pixel analysis of the captured image is performed to determine one or more characteristic differences between the visual object as captured in the first image and the background as captured in the first image. In some example embodiments, determining the one or more characteristic differences may include determining an intensity difference between pixels constituting the visual object in the captured image and pixels constituting the background in the captured image. Other examples of the one or more characteristic differences may include a difference between sharpness of the visual object and the background.

Process 700 may include at 706, selecting a distance determination mode from among a first mode and a second mode, based on the determined characteristic difference. When the characteristic difference as determined at 704, is significant—for example greater than or equal to a threshold, it indicates a scenario where the visual object is visually distinguishable by the imaging system from the background. In such, scenarios it is highly likely that the subject as well can be focused with the aid of the visual object. That is, the distance to the visual object can be determined using triangulation methods and that distance can be used to determine the corresponding focus position for the imaging system in the far-field of view. The computation of distance to the subject as the distance to the visual object may be considered as the first mode of distance determination.

However, if the characteristic difference determined at 704 is insignificant, for example less than the threshold, it corresponds to a scenario where the imaging conditions of the scene are not favorable for visually distinguishing the visual object with the background. For example, when the imaging system is used in a high ambient light environment such as outdoors, the high ambient light in the scene being imaged may result in a captured image that does not very well discriminate between a region of interest and the background. In such scenarios, if such a captured image is utilized for focusing the imaging system in the far field, it is likely that a distance to the visual object may not be determined due to the visual object being untraceable. Thus, the characteristic difference determined at 704 is an important trigger for selecting a suitable distance determination mode. In some example embodiments where the visual object is not distinguishable from the background (i.e. magnitude of the characteristic difference is less than the threshold), the distance to the subject is be determined using image disparity between the first image sensor and another image sensor of the imaging system. Such a mode of determining distance to the subject using image disparity may be considered as a second mode of distance determination, a detailed description of which is provided later with reference to FIG. 8.

Process 700 at 708 includes calculating a distance to the subject based on the selected distance determination mode. Having selected the suitable distance determination mode from among the first mode and the second mode, the distance to the subject is accordingly computed per the selected mode. A detailed description of distance computation is discussed later with reference to FIG. 8.

Process 700 includes at 710, controlling a second image sensor to capture a second image of the subject, based on the calculated distance to the subject. The determined distance to the subject is an important factor that helps decide the focus position of an image sensor. Accordingly, the discrete focus steps of a second image sensor such as a far-field image sensor, are determined corresponding to the determined distance to the subject. Towards this end, a look up table may be fetched by a controller executing the process 700, the look up table providing focus steps corresponding to distance to the subject. Once the focus position of the second image sensor is determined, the controller controls the associated optics of the second image sensor to move to the determined focus position and the second image sensor captures an image of the scene with the subject. The focus of the second image sensor is thus determined without incurring extra steps or resources. Moreover the movement of the associated optics is performed only as much as is required, without incurring any unnecessary motor moves, thus saving valuable on-board power supply and reducing chances of noise in the resultant image due to focus adjustment. Therefore, the process 700 provides an efficient measure to operate a multi-sensor imaging system/apparatus. Accordingly, an apparatus executing or utilizing the process 700 results in improvements in imaging and/or subsequent image processing tasks.

FIG. 8 illustrates a flowchart depicting example operations of a process 800 for focus control in a multi-imager environment, in accordance with at least one example embodiment of the present disclosure. Process 800 may be considered as a part of process 700 with special emphasis on selection of the distance determination mode and corresponding computation of the distance. Process 800 is triggered when image capture by a first image sensor such as a near-field image sensor is complete and ready for further processing. For example, with reference to the process 700 of FIG. 7, when the image capture at step 702 is complete, a controller executing the process 700 may invoke process 800 for further processing on the captured first image that includes an image of the subject with the visual object projected on it and a background of the subject.

Process 800 includes at 802, determining an intensity difference between a first intensity of the visual object in the first image and a second intensity of the background in the first image. As one example of the characteristic difference between the visual object and the background of the subject, an intensity difference between the visual object and the background may be determined. In some example embodiments, the intensity difference may be an indicator of the difference between pixel intensity values of the pixels corresponding to the visual object in the image and the pixel intensity values of the pixels corresponding to the background in the image. The intensity value for each pixel may be a single value for a gray-level image, or three values for a color image. The intensity value of some or all pixels of the first image may be utilized for determining the intensity difference as is described next with reference to FIG. 9A.

FIG. 9A shows an exemplary image 902 captured by a near-field image sensor for determining intensity difference between a visual object 904 and background of a subject 906. Image 902 may encompass an m×n array of pixels. As is illustrated in FIG. 9A, pixels within the region defined by coordinates $(M_p, N_i)$, $(M_q, N_i)$, $(M_q, N_j)$ and $(M_p, N_j)$ correspond to the visual object 904 which is represented as an aimer projection. Thus the pixels having position index $(M_p, N_i)$ to $(M_q, N_i)$, $(M_q, N_i)$, to $(M_q, N_j)$, $(M_q, N_j)$ to $(M_p, N_j)$ and $(M_p, N_j)$ to $(M_p, N_i)$ define the boundaries of the visual object 906 and therefore may be considered as the boundary pixels of the visual object 906. The pixels having position index $(M_{p-1}, N_{i-1})$ to $(M_{q+1}, N_{i-1})$, $(M_{q+1}, N_{i-1})$ to $(M_{q+1}, N_{j+1})$, $(M_{q+1}, N_{j+1})$ to $(M_{p-1}, N_{j+1})$, and $(M_{p-1}, N_{1+1})$ to $(M_{p-1}, N_{i-1})$ correspond to the pixels of the background that are in immediate proximity to the boundary pixels of the visual object 904. These pixels may be referred to as background pixels. In some example embodiments, the intensity difference between the boundary pixels and the background pixels may be calculated on a per pixel pair basis where each pixel pair comprises one boundary pixel and one background pixel that is in immediate proximity to the boundary pixel. In this regard, the intensity difference of each pixel pair may be determined and an average of the intensity differences of each pixel pair determines the intensity difference between the visual object and the background.

In some example embodiments, to calculate the intensity difference between the visual object and the background, a first average of the pixel intensity values of all the pixels corresponding to the visual object in the image and a second average of the pixel intensity values of all the pixels corresponding to the background in the image may be computed. The intensity difference may then be determined as a difference between the first average and the second average. In some scenarios, the background may encompass a large number of pixels that are positionally distant from the boundary pixels of the visual object. In such cases, to simplify computation, only those pixels corresponding to the background may be selected for computing the second average, that are within a threshold proximity from the boundary pixels of the visual object. Therefore, the intensity difference computed in any of the aforementioned manners may be used to determine if the visual object in the first image and the background of the first image are distinguishable with acceptable levels of clarity. In this regard, the intensity difference may be compared with a threshold value to ascertain if the visual object is distinguishable with the background or not.

Referring back to FIG. 8, the process 800 may include at 804 determining whether the intensity difference between the visual object and the background is greater than or equal to the threshold value. The threshold value may be a configurable value that can be set for example as per an operator's input or based on imaging modes. If the illumination conditions at the time of image capture of the first image are such that the visual object is distinguishable from the background in the captured image, the intensity difference may be greater than or equal to the threshold value. In such scenarios, the result of the determination at step 804 is a 'yes' and the control passes to step 806. At step 806, the process 800 includes determining a first location of the subject in the first image. The location of the subject may be determined using any suitable image processing technique and/or other machine learning technique. For example, identification of predetermined patterns pertaining to information indicia may be performed in the image. Such identification may be part of the workflow for decoding the information indicia and may be called as a sub-routine. In some example embodiments, the subject may be an information indicia such as a barcode 906 illustrated in FIG. 9A. The step of determining the location of the barcode 906 in the near field image 902 may include identifying locations within the near field image 902 that exhibit a high concentration of edges and a high concentration of low intensity values co-instantaneously as candidate locations for being a barcode.

For example, a suitable processing medium such as one or processors or a controller executing the process 800 may process the image 902 to identify edges within the digital image 902. Edges are locations of the digital image 902 that exhibit high contrast transitions in intensity. For example, an edge may define a transition from a low intensity to a high intensity, i.e., from light to dark, or from a high intensity to a low intensity, i.e., from dark to light. Due to the nature of barcodes, i.e., black and white (or other dark and light) patterns, barcodes generate prominent, easily detectable edges. To identify the edges within the digital image 902, the processing component may analyze the image 902 to detect locations in which luminance values exhibit significant change. The processing component may identify the edges within the image 902 using conventional edge detection techniques. For example, the processing component may apply a kernel matrix (e.g., a matrix of weights or multiplication factors) to the digital image 902 to detect the edges. The kernel matrix is typically much smaller than the actual image to which it is applied. A three pixel by three pixel (3×3) kernel matrix will be described for purposes of example. However, barcode detection module 34 may use a kernel matrix of other dimensions.

In some example embodiments, the 3×3 kernel matrix may be centered on each pixel of the image 902 in turn and multiplies the pixel values of the 3×3 region around the center pixel by the corresponding weights of the kernel matrix to generate weighted pixel values. Next, the weighted pixel values may be summed to obtain a first order derivative of the center pixel. The processing component may compare the first order derivative of the center pixel to a transition threshold value and detect an edge when the first order derivative is greater than or equal to the transition threshold value. If the first order derivative is greater than or equal to the transition threshold value, the pixel is determined to be located on an edge. In one aspect, the processing component may set pixels determined to be located at an edge to an intensity value associated with white or black, and set pixels determined to not be located at an edge to the opposite intensity value, e.g., black or white. Thus, the result of the edge detection may be an edge map that is a binary image that represents the original image 902 with all detail removed except for the identified edges. The binary image may be a black and white image in which the edges are white, and the rest of the image is black, or vice versa, i.e., edges are black, and the rest of the image is white. Although detection of the edges is described using the first derivative of the digital image 902, any suitable edge detection technique may be used to detect edges within the image 902, such as using a second order derivative of the digital image 902.

The processing component may also process the image 902 to identify regions of the image with low intensity (referred to here as "low intensity regions"). The low intensity regions correspond with the dark portions of the image 902. Barcode detection module 34 may identify the low intensity regions of the image 902 via thresholding. In particular, barcode detection module 34 may identify the low intensity regions of the image 902 by comparing each of the pixel intensity values with an intensity threshold value and filter out any pixel values that are greater than or equal to the intensity threshold value. Thus, the result of the low intensity detection may be a low intensity map that is a binary image that represents the original image 902 with the high intensity regions removed. In one example, barcode detection module 34 may set pixel intensity values that are less than or equal to the intensity threshold value to white and set pixel intensity values that are greater than or equal to the intensity threshold value to black. In this case, the low intensity regions of the image 902 are represented as white regions and the non-low intensity regions of the image 902 are represented as black. Alternatively, the low intensity regions may be represented as black regions and the other regions represented as white regions. In some instances, the processing component may process the digital image to identify the edges and low intensity regions of the image 902 in parallel.

The processing component may perform one or more morphological operations on the edge map to identify locations within the image 902 that exhibit a high concentration of edges. Likewise, the processing component may perform one or more morphological operation on the low intensity map to identify locations within the image 902 that exhibit a high concentration of low intensity values. The morphological operations may be performed on the edge map and the low intensity map concurrently (i.e., in parallel) or consecutively. The morphological operations may include one or more of a dilation operation, an erosion operation, an opening operation, a closing operation or the like. In one example, the processing component may perform dilation on the edge map and the low intensity map. The dilation generally fills in holes and broken areas and connects areas that are separated by spaces that are smaller than a size of a structuring element used for the dilation. For binary images, the structuring element, e.g., a 3 by 3 structuring element, is centered on each of the pixels. If any of the pixels within the structuring element are white, the pixel value that the structuring element is centered on is set to white. A similar approach may be performed for grayscale images. In grayscale images, for example, each of the pixel values may be recomputed using the structuring element by setting a pixel value equal to the maximum pixel value of the pixel values within the structuring element. In this manner, bright regions surrounded by dark regions grow in size, and dark regions surrounded by bright regions shrink in size. Small dark spots in images will disappear as they are "filled in" to the surrounding intensity value. The effect is most marked at places in the digital image where the intensity changes rapidly, e.g., in regions in which a barcode is located.

The processing component may then combine the dilated edge map and the dilated low intensity map. For example, the processing component may perform an "AND" operation to combine the dilated edge map and the dilated low intensity map. The combined image represents the portions of the image 902 that are identified as an edge and a low intensity region. In other words, the combined image represents the portions of the image at which edges and low intensity regions are spatially co-instantaneous.

If required, in some example embodiments, the processing component may again perform one or more morphological operations on the combined image. For example, barcode detection module 34 may perform another dilation operation on the combined image to fill in holes and broken areas and connect areas that are separated by spaces that are smaller than the size of a structuring element used for the dilation. The processing component may also perform a flood fill operation of the combined, dilated image to further fill any remaining holes within the regions of the combined, dilated image. The flood fill operation fills holes inside the object. In some instances, the processing component may perform a close operation instead of a flood fill operation. The close operation closes small holes that may be within the size of a filling element, whereas the flood fill operation closes all holes within the object regardless of the size of the hole. In this manner, the one or more morphological operations performed on the combined image make the regions with overlapping edges and low intensity portions a solid, or nearly solid, white region.

The processing component may then analyze the locations that remain in the combined image after the one or more morphological operations to identify locations of the digital image that may potentially be barcodes. In other words, processing component may determine whether the location is a candidate for being a barcode. For example, the processing component may compare each of the locations remaining in the combined image to one or more barcode criteria to determine whether the location is a candidate for being a barcode. The processing component may, for example, compare a size of the location to barcode size criteria to determine whether the location is too small or too big to be a barcode. If the size of the location is smaller than a threshold, the processing component may determine that the location is not a barcode. Locations that are too small, even if the location was detected as a barcode, may not be equipped with enough detail to resolve the barcode and may be discarded. As another example, the processing component may compare a shape of the location to a barcode shape criteria to eliminate locations that are not substantially similar to the shape of a barcode, e.g., rectangular or square. In yet another example, the processing component may compare a filling factor of the location with a barcode filling factor criteria. In particular, a square or rectangle may be placed around the location to determine how many pixels are not white relative to the surrounding rectangular area. If the percentage of pixels that are not white relative to the surrounding rectangular area exceeds a threshold percentage, the location may be eliminated from candidate locations.

The processing component may then determine whether the remaining locations are actually barcodes by verifying whether the remaining digital image at the locations have unique barcode features. In the case of some 2D barcodes, for example, the processing component may analyze the locations of the image identified as candidates for being a barcode to determine whether the identified location includes a barcode finder pattern. In the case of a 2D Data Matrix barcode, the processing component may look for unique perimeter pattern within the location, e.g., two perpendicular lines made up of alternating black and white square modules. In the case of a 2D QR barcode, the processing component may look for a finder pattern of nested alternating dark and light squares at three corners of the identified location. The processing component may, however, analyze the identified locations for other unique barcode finder patterns or other unique features associated with other barcode symbology. Moreover, the processing component may analyze images other than the original image 902, such as the grayscale version of the digital image, the generated edge map or the generated low intensity map for the unique barcode features or patterns. In this way, locations in the image 902 that correspond to the barcode (i.e. the subject) may be determined and output by the processing component at step 806.

The process 800 at 808 may include capturing by a second image sensor, a third image of the subject. The processing component may invoke a second image sensor different from the first image sensor to capture another image of the subject. In some example embodiments, the second image sensor may be an image sensor suitable for imaging in the far-field of view of the imaging system. As such, the second image sensor may have a rolling shutter. Alternately, in some less intensive applications the second image sensor may even have a global shutter. The second image sensor may capture an image of the scene including the subject.

Process 800 may further include at 810, determining a second location of the subject in the third image. The image captured by the second image sensor may be processed suitably by the processing component to determine a location of the subject in the captured image (i.e. the third image). For example, in example scenarios where the subject may be a barcode, the processing component may perform a sub-process for determining location of the barcode in the captured image in a manner similar to the one described with reference to step 806. Thus, at step 810 the second location of the subject in the third image (the image captured by the second image sensor) may be determined.

Process 800 may further include at 812 calculating the distance to the subject as a function of the first location determined at step 806 and the second location determined at step 810. The calculation of the distance to the subject requires computation of various parameters such as the baseline between the first image sensor and the second image sensor, the imaging distance of each of the first image sensor and the second image sensor, and a respective image offset of the first image sensor and the second image sensor. In some example embodiments, the distance z to the subject (from the imaging system/apparatus) may be calculated from the equation below:

$$z = \frac{B}{\left(\frac{d_1}{v_1} + \frac{d_2}{v_2}\right)}$$

where:

B is the baseline distance between the first image sensor and the second image sensor;

$v_1$ and $v_2$ are the imaging distance of the first image sensor and the second image sensor respectively;

$d_1$ and $d_2$ are the image offsets in the first image and the third image which are calculated from the first location of the subject and the second location of the subject.

The baseline B of the first image sensor and the second image sensor may be obtained from design of the imaging apparatus/system. As is illustrated in FIG. 9B, the baseline distance B between the two image sensors corresponds to the straight-line distance between the optical centers $O_1$ and $O_2$ of the sensors. For example. $O_1$ may correspond to the optical center of the first image sensor and $O_2$ may correspond to the optical center of the second image sensor. In some example embodiments, the optical center of an image sensor may be considered from the center of the area of the image sensor that is to be exposed to incoming illumination from the scene for an image to be captured.

The distance between the optical center and the starting point of an optical axis of an image sensor may define the imaging distance 'v' for that image sensor. Referring to FIG. 9B, imaging distance $v_1$ of the first image sensor may correspond to the straight-line distance between the points $O_1$ and $C_1$. In a similar manner, the imaging distance $v_2$ of the second image sensor may correspond to the straight-line distance between the points $O_2$ and $C_2$.

The distance between the starting point of the optical axis of an image sensor and the center of subject formation on the image sensor (i.e. location of subject in the captured image) may define the image offset 'd' of the image sensor and its corresponding captured image. The image offset in the first image and the second image are functions of the location of the subject in their respective captured images. For example, the image offset of the first image sensor is a function of the first location of the subject in the first image of the subject while the image offset of the second image sensor is a function of the second location of the subject in the third image. Referring to FIG. 9B, the image offset $d_1$ for the first image may correspond to the straight-line distance between the points $C_1$ and $A_1$. In a similar manner, the image offset $d_2$ for the second image may correspond to the straight-line distance between the points $C_2$ and $A_2$.

In this manner, example embodiments described here in provide an effective process for estimating distance to a subject even when the imaging conditions may not be suitable for effective image capture.

Referring back to the determining at step 804, if the illumination conditions at the time of image capture of the first image are such that the ambient light is very high, the visual object may fuse or be subdued with the background in the captured image. In such situations, the intensity difference may be less than the threshold value and the result of the determining at step 804 is a 'no' and the control passes to step 814.

Process 800 may include at 814, calculating a depth of the visual object in the first image as the distance to the subject. Thus, when the imaging conditions indicate that the visual object. for example, the aimer 904 of FIG. 9A, is substantially distinguishable from the background, example embodiments of the present invention may provide for a less intensive process for calculating the distance to the subject. In such scenarios, the distance to the subject may be estimated as the depth to the visual object determined from the image captured by the first image sensor at step 702 of FIG. 7. In this regard, distance can be determined by any suitable approach such as but not limited to triangulation.

In this way, example embodiments described herein provide methods, apparatuses and systems for effectively determining distance to a subject by proper selection of an appropriate distance determination mode. In some example embodiments, the processes 700 and/or 800 may be triggered in scenarios where ambient illumination prevents capture of the subject with a predefined level of clarity.

Having calculated the distance to the subject by any of the distance determination modes, the process 800 at 816 includes changing a focus position of the second image sensor based on the calculated distance to the subject. The estimated distance to the subject is a measure of how far the subject is located from the imaging apparatus/system. Thus, the estimated distance to the subject may be utilized to determine a corresponding focus position of the optics of an image sensor. If the subject lies in the far field of the imaging apparatus/system, a far field image sensor may be better suitable for imaging in a far field of the imaging apparatus/ system. However, if the subject lies in the near field of the imaging apparatus/system, a near field image sensor may be the preferred choice for image capture. In some example embodiments the estimated distance to the subject may be utilized to determine which image sensor is suitable for image capture of the subject for further processing. For example, if the estimated distance to the subject is less than or equal to a threshold, the near field image sensor may be utilized for image capture, however, if the estimated distance to the subject is more than the threshold, the far field image sensor may be utilized for image capture of the subject. Accordingly, focus selection based on the estimated distance for the selected image sensor may be performed. In this regard, the processing component may reference a look up table describing the relationship between the distance to the subject and the focus steps for an image sensor. Using the look up table, the appropriate focus steps may be decided, and the particular image sensor may be moved in accordance with the determined focus steps.

In this way, example embodiments described herein provide methods and machines for moving the suitable image sensor to a position from where the subject is in focus. Some embodiments are directed to scenarios where ambient illumination inhibits the subject from being in focus with an image sensor. Embodiments described herein provide for time efficient as well as energy efficient automatic focus selection. Such embodiments take into consideration one or more imaging conditions to select a best fit mode for determining the depth of the subject and perform focus selection according to selected best fit mode.

FIG. 10 illustrates an example workflow of an indicia decoding process executed by an example multi-sensor imaging system, in accordance with at least one example embodiment of the present disclosure. In some example embodiments, the imaging system 10 and/or the imaging apparatus 200 may include or be a part of an exemplary symbol reading device such as an indicia reader. Process 1000 as illustrated in FIG. 10 provides a symbol decoding method that includes various aspects of the methods 700 and 800. A symbol reader having multiple image sensors, when implementing the process 1000 is able to mitigate the problems arising out of autofocus selection in multi-imager environments and is thus able to provide a fast and energy efficient autofocus scheme and error free or reduced error capture of images of the symbol. This results in faster and efficient decoding of the symbol. Further advantages of the workflow will become evident through the following disclosure.

Some or all the steps of process 1000 may be carried out by appropriate data processing means and control means. For example, in some example embodiments, the process 1000 may be carried out by a controller or one or more processors of the symbol reader. In some example embodiments, the controller of the symbol reader may be embodied in a manner similar to that described with reference to controller 20 of the imaging system 10.

The process 1000 is triggered upon receipt of an input from a user on the activation component 206 of the imaging apparatus 200. In response, process 1000 begins at 1002 by turning on the aimer as an indicator. As described with reference to FIG. 2, the aimer illumination source 110 and the aimer projection optics 112 may together produce the aimer as a desired pattern. In some example embodiments, the aimer is projected onto the scene through an aimer projection optics. Next, at 1004, the process 1000 includes capturing a first image of the scene including an indicia as a subject. The first image may be captured by a near-field image sensor with the aimer turned ON. As such, the first image may also be referred to as a near-field image. In some example embodiments, the near-field image may preferably be captured with the near-field illumination turned OFF. However, if the ambient illumination may not be sufficient for capture of the near-field image, the near-field image sensor may capture the near-field image with the near-field illumination turned ON.

At 1006, an intensity difference between the projected aimer and the background is determined. The intensity difference may be determined in a variety of ways, for example in the manner as discussed previously with reference to FIG. 8. At 1008, a check on the determined intensity difference is performed. The check determines if the determined intensity difference is greater than or equal to a threshold value. At 1008, if the result of the check indicates a 'YES' the control passes to 1010 where a first mode is selected as the distance determination mode. However, if the result of the check at 1008 indicates a 'NO', the control passes to 1012 where a second mode is selected as the distance determination mode. The first mode corresponds to a sequence of steps for determining the distance to a subject such as the indicia, based on distance of the projected aimer as captured in the near-field image. The second mode corresponds to a sequence of steps for determining the distance to a subject such as the indicia, based on location of the subject in the near-field image and a far-field image captured by a far-field image sensor.

Having selected the suitable distance determination mode, process 1000 includes at 1014, calculating a distance to the indicia based on the selected distance determination mode. The distance to the indicia may be calculated as per the selected mode in accordance with the steps 812 or 814 of FIG. 8, as the case may be. The calculated distance is a measure of the distance of the indicia from the imaging engine. Accordingly, at 1016, process 1000 includes moving the imaging engine in the far field to a focus position determined based on the calculated distance to the indicia. As discussed previously with reference to step 816 of FIG. 8, the corresponding focus position of the far-field image sensor may be determined based on the calculated distance to the indicia and the imaging optics of the far-field image sensor of the imaging engine may be moved as per the determined focus position/focus steps. This ensures that the indicia is in focus with the far-field image sensor.

At 1018, an image of the in-focus indicia is captured by the far-field image sensor from the set focus position. The image may be referred to as a far-field image of the indicia. The process 1000 includes at 1020, decoding the captured far-field image of the indicia to extract information encoded in the indicia. The result of the decoding may be output by the indicia reader for subsequent operations or processing.

In this way, the exemplar workflow illustrated in FIG. 10 may be utilized to perform symbol/indicia decoding by suitable hardware, whereby owing to the improved focus selection control provided by the selected distance determination mode, the likelihood of successfully decoding the target symbol from the near-field image and/or the far-field image is increased significantly. Such an improvement in the decoding process brings about an improvement in the overall functionality of the symbol decoder device itself.

Although the exemplar workflow illustrated in FIG. 10 has been described considering an end application as symbol decoding, it may be contemplated that within the scope of this disclosure, other end application tasks utilizing dual or multiple image sensors (and thereby multiple illumination sources) may as well be modified to benefit from the improved illumination control and synchronization framework provided herein. That is, in no way should the scope of the disclosure be limited to symbol decoders alone and suitable modifications may be made to extend the illumination control framework to similar end use cases such as multi-camera based mobile phones. In some example contexts, the multi-image sensor device may be embodied as a smartphone having at least two cameras. The cameras may have a same or separate illumination source associated with each of them. At least one camera in the smartphone may be considered as a primary camera which is associated with image capture in bright, well lit, as well as low lit scenarios. The image quality of such cameras may be directly associated with the megapixel (MP) strength and as such in some example embodiments, the primary camera may have 12, 24, 48 or 64 MP. One or more other cameras in the smartphone may be considered as secondary cameras associated with one or more image enhancement functions. For example, the smartphone may have a telephoto lens supporting ultra-zoom options. In some example embodiments, the telephoto lens may support a zoom factor that ranges between 2× to 10×. In some more advanced embodiments, the smartphone may have an ultra-wide angle lens for enhancing the field of view of the smartphone. Additionally or optionally, in some example embodiments, the smartphone may include a depth sensor to measure the depth of background objects in comparison with primary subjects in the field of view. The smartphone may be equipped with a memory storing programming instructions corresponding to the logic illustrated in the methods 700, 800, and 1000. These programming instructions may be executable by a processor of the smartphone to carry out automatic focus selection during image capture of a subject. Since the example embodiments also provide an adaptive process for focus selection, the proposed solutions apply to a wide variety of imaging scenarios and situations.

It will be understood that each block of the flowcharts and combination of blocks in the flowcharts illustrated above in FIGS. 7, 8, and 10 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the imaging apparatus/system. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions/operations. It will also be understood that one or more blocks of the flowcharts, and combinations of blocks in the flowcharts, can be implemented by special purpose hardware-based computer systems which perform the specified functions, or combinations of special purpose hardware and computer instructions.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a visual machine, or a combination of one or more of them. The apparatus and execution environment can realize various computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code).

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    capturing, by a first image sensor, a first image of a visual object, wherein the first image is captured during at least a portion of a first illumination period, wherein a first illumination source is activated to illuminate a first field of view during the first illumination period;
    calculating a distance to the subject based on a distance determination mode, wherein the distance determination mode is determined based on a characteristic difference between the visual object in the first image and a background in the first image; and
    controlling a second image sensor to capture a second image of the subject based on the calculated distance to the subject, wherein the second image is captured during at least a portion of a second illumination period, wherein a second illumination source is configured to illuminate a second field of view during the second illumination period, and wherein the first illumination period is different from the second illumination period.

2. The method of claim 1, further comprising determining the characteristic difference between the visual object in the first image and the background in the first image, wherein determining the characteristic difference comprises determining an intensity difference between a first intensity of the visual object in the first image and a second intensity of the background in the first image.

3. The method of claim 2, further comprising selecting a distance determination mode from among a first mode and a second mode based on the characteristic difference, wherein selecting the distance determination mode comprises:
    in response to the intensity difference being greater than or equal to a threshold, selecting the first mode as the distance determination mode; and
    in response to the intensity difference being less than the threshold, selecting the second mode as the distance determination mode.

4. The method of claim 3, wherein the first mode comprises calculating a depth of the visual object in the first image as the distance to the subject.

5. The method of claim 3, wherein the second mode comprises:
    determining a first location of the subject in the first image;
    capturing by the second image sensor, a third image of the subject;
    determining a second location of the subject in the third image; and
    calculating the distance to the subject as a function of the first location and the second location.

6. The method of claim 5, further comprising calculating the distance to the subject, based on imaging distances of the first image sensor and the second image sensor.

7. The method of claim 5, wherein calculating the distance to the subject as a function of the first location and the second location comprises:
    calculating a first image offset of the first image based on the first location;
    calculating a second image offset of the third image based on the second location; and
    calculating the distance to the subject based on the first image offset and the second image offset.

8. The method of claim 1, further comprising changing a focus position of the second image sensor based on the calculated distance to the subject.

9. The method of claim 8, further comprising:
    capturing by the second image sensor, the second image of the subject from the changed focus position; and
    decoding the second image to extract information encoded in the subject.

10. The method of claim 5, wherein
the visual object is an aimer projection,
the subject comprises an information indicia,
the first image sensor comprises a near-field image sensor, and
the second image sensor comprises a far-field image sensor.

11. A system, comprising:
a memory configured to store executable instructions; and
one or more processors configured to execute the executable instructions to:
control a first illumination source to illuminate a first field of view for a first illumination period;
obtain, from a first image sensor during at least a portion of the first illumination period, a first image of a visual object with a background associated with a subject;
calculate a distance to the subject based on a distance determination mode, wherein the distance determination mode is determined based on a characteristic difference between the visual object in the first image and a background in the first image;
control a second illumination source to illuminate a second field of view for a second illumination period, wherein the second illumination period occurs after at least a portion of the first illumination period; and
control, based on the calculated distance to the subject, a second image sensor to capture a second image of the subject during at least a portion of the second illumination period.

12. The system of claim 11, wherein the one or more processors are configured to determine the characteristic difference between the visual object in the first image and the background in the first image by determining an intensity difference between a first intensity of the visual object and a second intensity of the background.

13. The system of claim 12, wherein the one or more processors are configured to select a distance determination mode from among a first mode and a second mode in response to the intensity difference being greater than or equal to a threshold, select the first mode as the distance determination mode; and in response to the intensity difference being less than the threshold, select the second mode as the distance determination mode.

14. The system of claim 13, wherein the first mode comprises instructions to calculate a depth of the visual object in the first image as the distance to the subject.

15. The system of claim 13, wherein the second mode comprises instructions to:
determine a first location of the subject in the first image;
obtain from a second image sensor, a third image of the subject;
determine a second location of the subject in the third image; and
calculate the distance to the subject as a function of the first location and the second location.

16. The system of claim 15, wherein the one or more processors are further configured to calculate the distance of the subject, based on imaging distances of the first image sensor and the second image sensor.

17. The system of claim 15, wherein to calculate the distance of the subject as a function of the first location and the second location, the one or more processors are configured to:
calculate a first image offset of the first image based on the first location;
calculate a second image offset of the third image based on the second location; and
calculate the distance of the subject based on the first image offset and the second image offset.

18. The system of claim 11, wherein the one or more processors are further configured to change a focus position of the second image sensor based on the calculated distance to the subject.

19. The system of claim 18, wherein the one or more processors are further configured to:
obtain from the second image sensor, the second image of the subject from the changed focus position; and
decode the third image to extract information encoded in the subject.

20. An imaging apparatus, comprising:
a first image sensor configured to capture a first image of a visual object with a background associated with a subject;
a second image sensor;
a first illumination source configured to illuminate a first field of view capturable by the first image sensor;
a second illumination source configured to illuminate a second field of view capturable by the second image sensor; and
a controller configured to:
obtain the first image from the first image sensor, wherein the first image is obtained in an instance in which a first illumination source is illuminated;
control the second image sensor to capture a second image of the subject based on a calculated distance, wherein the calculated distance is derived from a characteristic difference between the visual object in the first image and the background in the first image, wherein the second image is captured in an instance in which a second illumination source is activated.

* * * * *